April 28, 1964  O. HABERKORN ETAL  3,130,904
CALCULATING MACHINE WITH STORING MECHANISM
Filed Oct. 19, 1959  15 Sheets-Sheet 1

INVENTORS
Otto Haberkorn
Walter Roupel
Otto Doth

April 28, 1964  O. HABERKORN ETAL  3,130,904
CALCULATING MACHINE WITH STORING MECHANISM
Filed Oct. 19, 1959  15 Sheets-Sheet 6

INVENTORS
Otto Haberkorn
Walter Rumpel
Otto Roth

INVENTORS
Otto Haberkorn
Walter Rempel
Otto Roth

April 28, 1964   O. HABERKORN ETAL   3,130,904
CALCULATING MACHINE WITH STORING MECHANISM
Filed Oct. 19, 1959   15 Sheets-Sheet 14

INVENTORS
Otto Haberkorn
Walter Rempel
Otto Roth

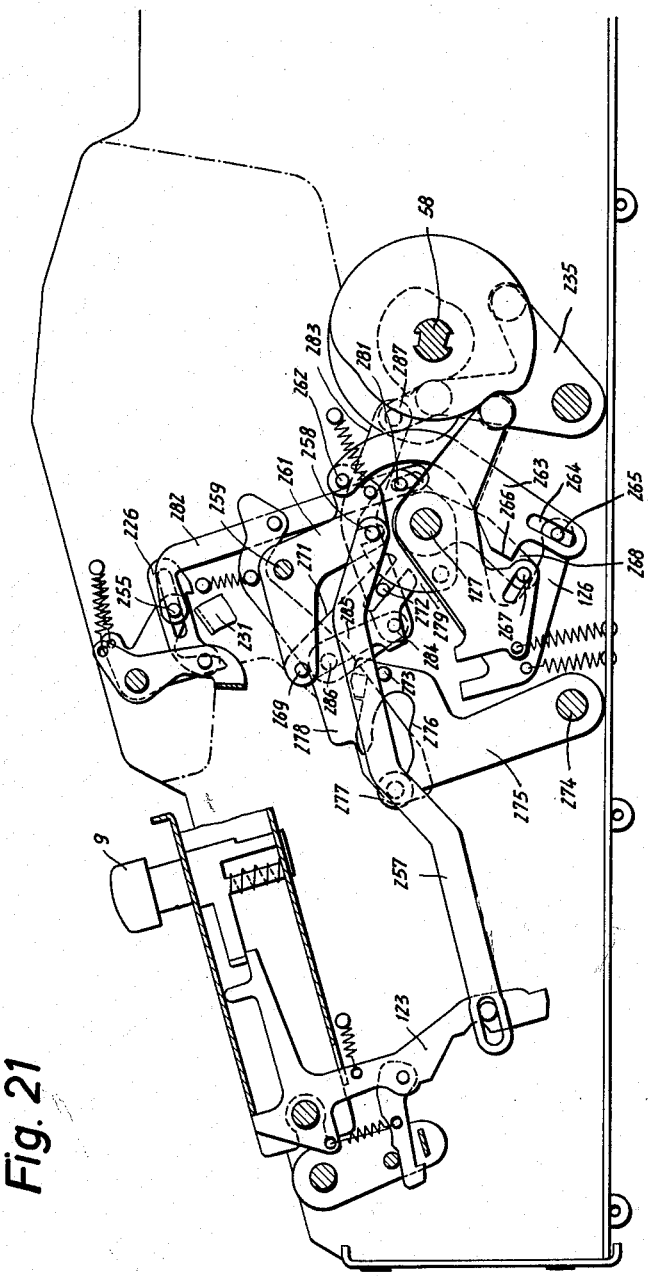

United States Patent Office 3,130,904
Patented Apr. 28, 1964

3,130,904
CALCULATING MACHINE WITH STORING
MECHANISM
Otto Haberkorn, Walter Rompel, and Otto Roth,
Gerstetten, Wurttemberg, Germany, assignors to
Walther Buromaschinen Gesellschaft m.b.H.,
Gerstetten, Wurttemberg, Germany, a firm
Filed Oct. 19, 1959, Ser. No. 847,277
12 Claims. (Cl. 235—60)

The invention relates to a calculating machine having a storing mechanism therewith is meant in the following specification and the claims an accumulator not utilising a transfer device being brought into and out of engagement with the actuating mechanism for the reception of the value calculated in the actuating mechanism during the operation of the machine, and for repeated additive or subtractive, as the case may be, reentering the value into the actuating mechanism.

With machines of this kind, each value passing the actuating mechanism of the machine, which may be an item, a total, or a product, will be automatically brought into the storing mechanism, in order either to reenter it into the actuating mechanism on the next operation of the machine or to retain it, upon disconnecting the storing mechanism from the actuating mechanism, during any number of operations of the machine and then to bring it back into the actuating mechanism by depressing a repeating key.

Therewith, the storing mechanism is provided with a clearing mechanism, whereby the value transmitted to the storing mechanism during an operation of the machine having no further use, will be cancelled at the beginning of the next operation of the machine, provided that neither the repeating key, nor the storing lever has been actuated. The print of the taken total can be disconnected.

For calculating products, with known machines of this type, besides said storing mechanism, a particular multiplying mechanism will be used, into which the multiplier is set up directly or by means of the actuating mechanism. The figures set in the different orders of this multiplying mechanism control the formation of the partial-products of a multiplication. If as one of the factors of the multiplication a number contained in said storing mechanism is to be used, it must be transmitted to the multiplying mechanism by particular set and machine operations.

In order, now, to accelerate said calculations and to simplify the mounting of the machine, according to the invention, the storing mechanism is formed itself as multiplying mechanism. Between the storing mechanism, the actuating mechanism, and the setting mechanism engageable and disengageable operative connections are provided for, by which the partial products formed according to the factors set up in the setting mechanism and according to the different denominational digits of the storing mechanism, will be transmitted to the totalizer of the machine.

Therewith, the storing mechanism may be formed in any design, for instance as set of wheels or as set of racks. The actuating mechanism may consist of oscillating, spring-urged differential members, or provided with rotatable actuating elements. It may work with subsequent, or repeated addition, or in connection with partial product plates. Transmitting of the multiplier from the storing mechanism may be performed, for instance, by sensed step discs connected with the storing wheels, by stepwise turning back the storing wheels, or by other known means. The amount setting mechanism may comprise a full keyboard or such one having ten digit keys.

On using a differential mechanism having oscillating differential members working according to the method of repeated addition the different denominational figure values of the storing mechanism suitably control, in a manner per se, the number of additions of the multiplicand set in the setting device to the totalizer under stepwise cancelling the concerned order of the storing mechanism.

The design of the machine will be further essentially simplified, in that the denominational shifting for the partial products coordinated to the individual denominational digit values will be performed by the denominational shifting of a set pin carriage of a ten key setting mechanism set up to the multiplicand, the storing mechanism being stationary in lateral direction with respect to the actuating members. The two factors of a multiplication being set up, in a manner known per se, one after the other by the same set of ten keys.

The invention further provides that on depressing a multiplier key the first factor of the multiplication will be transmitted into the storing mechanism and the latter will be retained out of engagement with the differential mechanism. On depressing a multiplicand-key the second factor set up by means of the amount keys will be introduced only into the differential mechanism and will be printed.

At the same time, the automatic multiplication will be released and at the termination of it the total will be taken from the totalizer and the product of the calculation will be printed. In connection therewith the storing mechanism again engages the differential mechanism so that the product will be brought into the storing mechanism, in order that it may be calculated in any way on the following operation of the machine, for instance as discount, account of interest, percent rise or the like.

Particular advantages arise by this on calculating of products of more than two factors, whereby after the termination of a multiplication of two factors, the product formed in the totalizer and taken and printed as total will be brought directly into the storing mechanism as a new multiplier, so that after setting up a further factor in the setting mechanism and depressing the multiplicand key the product of more than two factors can be calculated and printed without any further adjusting. Printing of the taken total can be disengaged.

A particular clearly arranged printing representation of the operations occuring with such a chain multiplication is formed on the paper strip, in that the print of the partial products can be disconnected or suppressed by means of a particular setting means. The end product will be transmitted, on its printing, into the storing mechanism.

Further features and advantages of the invention result from the following description of an example of embodiment of the invention in application to an adding and subtracting machine with oscillating spring urged differential members, ten key setting mechanism, set pin carriage and printing mechanism.

In the accompanying drawing:

FIG. 16 is a partial view of control means for the storing mechanism and the set pin carriage.

FIG. 21 is a side-elevation of the control means attached to the repeat key.

1. *The Setting Means and the Functions of the Machine*

The represented calculating machine containing the invention has the character of an adding and subtracting machine with printing mechanism, ten digit keys, set pin carriage, oscillating spring actuating members, totalizer, totalizing mechanism and storing mechanism.

Figure 1:
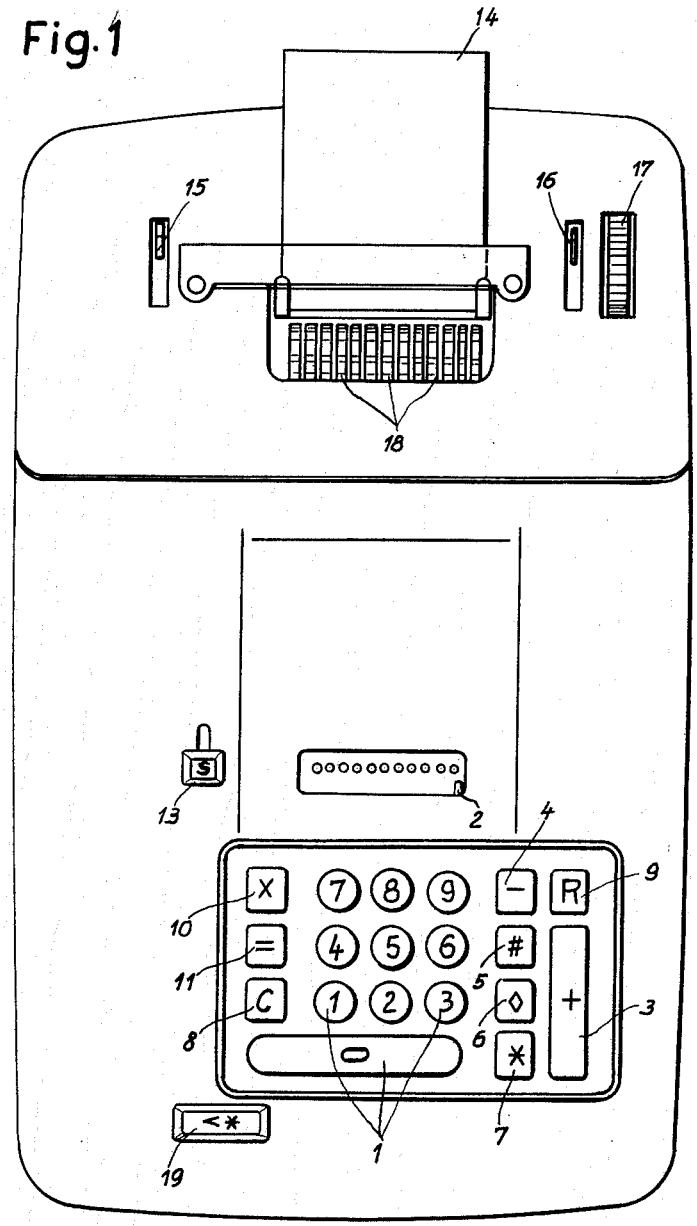
FIG. 1 is a plan view of the machine.

The setting means of the machine represented in FIG. 1 comprise ten digit keys 1 with the digit keys 1 to 9 and a zero key bar, an order indicator 2 for indicating the adjusted orders, respectively, the position of the set pin carriage, function keys 3 to 7 and 9 on the right-hand side, a correction key 8 and function keys 10 and 11 on the left-hand side of the ten key set.

The function keys on the right-hand side are designated for the usual operations of additive and subtractive calculations. By depressing the add key 3, the amount entered in the set pin carriage by means of the digit keys 1 will be added in the totalizer through the differential actuating mechanism and printed. The subtract key 4 causes the changing of the totalizer to subtraction. On depressing the non-add key 5 the introduced number will be printed but not added, on depressing the subtotalizing key 6, the amount contained in the totalizer will be printed and brought back into the totalizer, on depressing the totalizing key 7 the amount of the totalizer will be printed and the totalizer will be cleared.

The repeat key 9 indicated by R causes the transmitting of the value contained in the storing device to the actuating mechanism and the printing of this value.

The two keys 10 and 11 situated on the left-hand side of the digit keys 1 will be used for the performance of a multiplication. When after setting up the first factor of a multiplication in the digit keys 1 the multiplier key 10 has been depressed, the factor will be introduced into the actuating mechanism and printed and transmitted to the storing mechanism as multiplier.

By depressing the multiplicand key 11 for setting up the second factor (multiplicand) in the set pin carriage by the digit keys 1, this second factor will be printed through the actuating members on the paper strip and subsequently thereto multiplication will be automatically performed.

Thereby the set pin carriage will be shifted step by step to the left (FIG. 3) and in each of its order positions the factor will be transmitted from the set pin carriage to the actuating members and will be added to the totalizer as often as corresponds to the value of the related order of the multiplier. Therewith, the wheels of the storing mechanism will be restored step by step to zero. Further, after termination of the multiplication, the product will be automatically printed by totalizing from the totalizer and transmitted to the storing mechanism.

The correction key 8 (FIG. 1) serves for the cancellation of an erroneously set number in the set pin carriage and for returning of the latter into its home-position.

The disconnecting lever 19 for the total printing located at the left lower edge of the key-board serves for disconnecting printing of the product of a completed multiplication or partial multiplication.

At the left upper edge of the key-board, a storing lever 12 is recognizable, which, in its end position, represented in FIG. 1, disengages the storing action of the storing mechanism. In this position of the storing lever the value running through the actuating mechanism at each machine cycle will be transmitted to the storing mechanism, but at the beginning of the next machine operation will be immediately canceled or cleared again.

When the storing lever 13 is shifted into its rear-position, that is the upper position in FIG. 1, the storing mechanism remains disconnected from the actuating mechanism and the cancellation mechanism for the storing mechanism will be made inactive, so that the value contained in the storing mechanism remains in it and the amounts running through the actuating mechanism do not enter the storing mechanism. The amount then may be transmitted to the actuating mechanism as often as desired by the repeat key 9.

At the upper end of FIG. 1 a portion of the paper strip 14 is visible. On the left there is a paper tensioning lever 15 for alining the paper strip and on the right a non printing lever 16 for disengaging the printing and a knurled wheel 17 for turning the paper strip roll. Beneath the paper strip 14 a portion of the type segments 18 is visible. The totalizer of the machine is arranged under cover.

2. *General Construction of the Calculating Machine*

Figure 2:
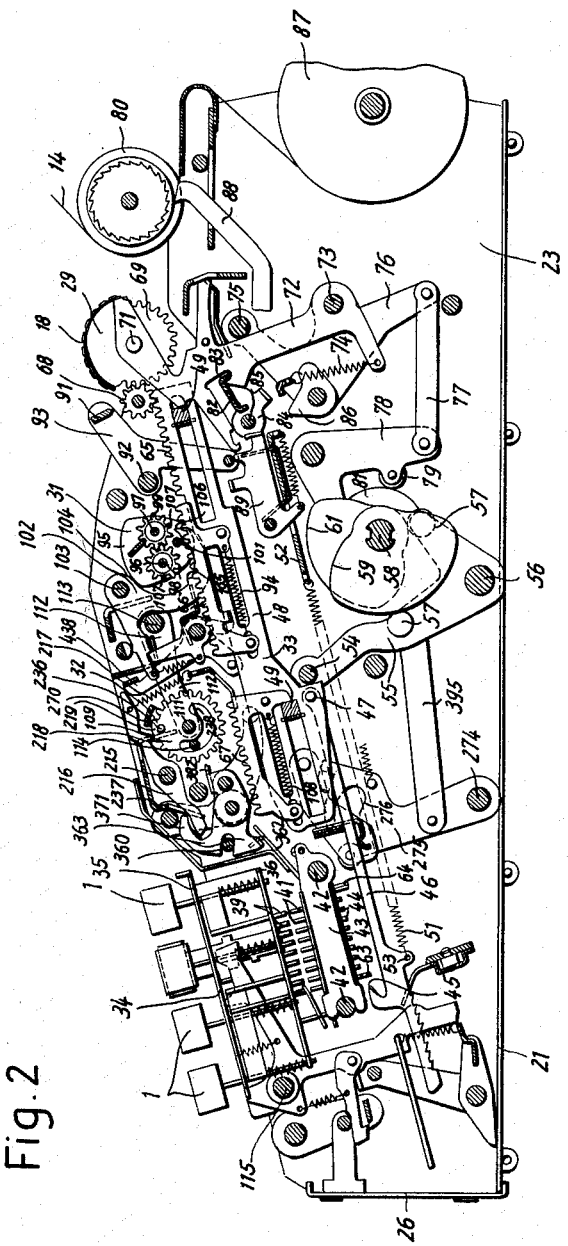
FIG. 2 is a vertical longitudinal section of the machine.
Figure 3:
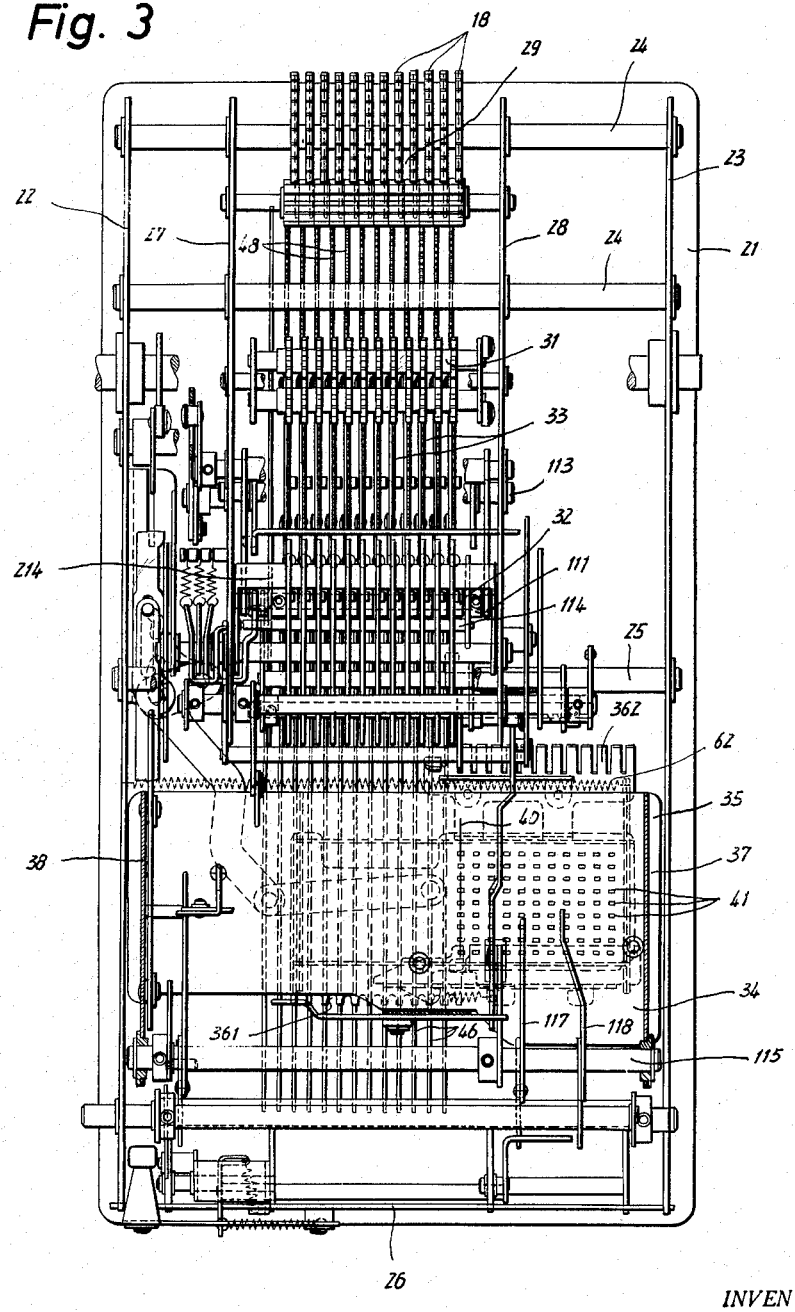
FIG. 3 is a plan view of the machine, the casing and setting means being removed.

*Setting mechanism.*—On a base plate 21 (FIG. 2) vertical lateral-walls 22, 23 (FIG. 3) are secured, which are connected with each other by cross rods 24 and 25, and a cross wall 26. The cross rods 24, 25 carry intermediate walls 27 and 28 between which the printing mechanism 29 (FIGS. 2 and 3), the totalizer 31, the storing mechanism 32 and the actuating mechanism 33 are located. At the front part of the machine, i.e. in FIG. 2 the left, and in FIG. 3 the lower part, there is arranged a key frame 34, which consists of two transverse plates 35 and 36 (FIG. 2) and of vertical walls 37 and 38 (FIG. 3).

The digit keys 1 (FIG. 2) are vertically shiftably mounted in the key-frame 34, terminating in projections 39, which are arranged one after the other of a row in longitudinal direction 40 (FIG. 3) of the machine, and well from the left to the right in the sequence of the digit values 0 to 8.

The key-projections 39 (FIG. 2) cooperate with set pins 41, which are vertically shiftably in a set pin carriage 43 transversally shiftable on stationary cross-rods 42, the set-pins 41 cooperating by means of their lower ends 44 with actuating noses 45. The latter are secured to levers 46 linked to the actuating rods 48 by means of pivots 47. For each decimal order an actuating rod 48 together with lever 46 and an actuating nose 45 is provided for.

*Actuating mechanism.*—The actuating rods 48 are shiftably mounted on stationary square rods 49 and are urged by tension springs 51 attached at their right ends to a stationary rail 52 and attached at their left ends to projections 53 of the levers 46, tending to draw them to the right.

Usually, i.e. in the position of rest of the machine, the actuating rods 48 being retained in their left position of rest by a transverse restoring rod 54, in which position of rest the actuating noses being out of the range of the set pins 41.

The restoring rod 54 is carried at its ends by arms 55 rigidly secured to a stationary shaft 56, one of the arms cooperating by means of rollers 57 with cam discs 59, 61 secured to a main actuating shaft 58 in such a way, that during the first half of each machine operation the restoring rod 54 will be rocked to the right and will be returned to the left into the represented position of rest during the second half of the operation of the machine.

Thereby the actuating rods 48 likewise tend to perform an oscillating movement under the action of their springs 51.

The set pin carriage 43 transversally shiftable on the cross rods 42 is urged by a tension spring 62 (FIG. 3) which tends to draw it to the left. In the right hand end and home position of the carriage the outermost left row of set pins 41 is situated alongside the actuating rod 48 of the lowermost order and beneath the key projections 39 (FIG. 2) the position of which being marked by the dash and dotted line 40 in FIG. 3.

On setting up a number in the key-board 1 (FIG. 1) on which, beginning with the highest order of the number, the respective individual digit keys being depressed one after the other, the corresponding set pins 41 (FIG. 2) will be pressed out downwardly and its lower end 44 will be adjusted in the horizontal acting plane of the actuating nose 45. At the same time the set pin carriage 43 will be moved by an order space to the left by means of a step by step actuating mechanism under the action of the tension spring 62 (FIG. 3), so that the set up pins 41 being moved into the vertical actuating plane of the actuating noses 45 (FIG. 2) of the actuating rods 48. On the left-hand side of each set pin row 41 (FIG. 2) there is a zero abutment 63.

When, now, the actuating rods 48, at the beginning of a machine operation, are released by rocking the restoring rod 54 to the right (FIG. 2) they will be moved to the right by their springs 51 as far that their actuating noses 45 strike either one of the set up pin ends 44 or a zero abutment 63. No set pin 41 is coordinated to the digit key having the value "9"; instead of that a rigid nine-abutment 64 is provided for on which strikes the related actuating nose 45 after movement of ten actuating units, if in the related order of the set pin carriage a "9" has been set up.

Each actuating rod 48 is provided with three racks and well with a rack 65 for the adjustment of the type segments 18, a rack 66 for the additive or subtractive actuation of the totalizer 33, and a rack 67 for the actuation of the storing mechanism.

*Printing mechanism.*—The racks 65 for the printing type adjustment are rigidly secured to the actuating rods 48 and are permanently in mesh with intermediate wheels 68 which in their turn usually engage teeth 69 of the type segments 18, which are pivotally mounted on type hammer levers 72 by means of pivots 71. The type hammer levers oscillate about a bearing rod 73 and are urged clockwise by means of springs 74. Usually, they are maintained in their position of rest represented in FIG. 2 by a restoring bar 75 which is carried by levers 76 mounted on the bearing rod 73, one of the levers 76 being connected by a link 77 with a roller lever 78 cooperating by rollers 79 with a cam disc 81 rgidly secured on the main drive shaft 58.

Besides this, the type hammer levers 72 are held by a detent rail 82 having U-shaped section engaging recesses 83 of the type hammer levers. This detent rail 82 is rockably mounted on a cross-rod 85 by means of arms 84 and will be lifted out of the recesses in the last part of the releasing movement of the restoring bar 75 by a latch 86 mounted on one of the levers 76, so that the type hammer levers 72 will be released and will strike clockwise against a platen 80 under the action of their springs 74, whereby the type segments 18 disengaged from intermediate wheels 68, print the digit types previously adjusted by the movement of the actuating rods 48. On disengaging of the intermediate wheels 68 from the toothed segments 69 the type segments 18 will be locked in their adjusted turning position by means not shown in the drawing.

*Paper mechanism.*—The line spacing device for the paper strip running over the platen 18 (FIG. 2) and starting from a storage roller 87 is performed by an actuating pawl 88 the drive and control of which will be explained later on.

For the controlling of the zero printing the device represented at 89 (FIG. 2) will be used, which is conventional and well known. The intermediate wheels 68 and with them the type segments 18 and actuating rods 48 will be aligned after being adjusted in dependence on the set pin carriage and before the performance of the printing at the end of the first half of the machine operation by an aligning rail 91 which forms together with arms 93 rigidly secured to a stationary mounted shaft 92 a rocking bail.

*Totalizer.*—The second racks 66 (FIG. 2) designated for the totalizer are shiftably mounted in slots of the actuating rods 48 for the performance of the tens transfer, usually maintained in their left end position by springs 94. The frame 95 of the totalizer carries two shafts 96, 97 for the mounting of the adding and subtracting wheels 98, 99 being permanently in engagement with each other. By rocking the totalizer frame about the axle 101 either the adding wheels 98 or the subtracting wheels 99 can be rocked into the engagement position with the toothing 66.

The required tens transfers will be performed by the tens transfer mechanism denoted by 102. This transfer mechanism is of the general known type in which the tens unit is transmitted to the next higher order by toothed members, such as the racks 65 (FIG. 2) cooperating with the totalizer wheels, such as 98, 99 and being movably mounted on the differential members such as the actuating rods 48. A transfer mechanism of this type is for instance shown in the U.S. patent specification No. 2,834,542. This mechanism is provided with tens counter levers 104 rockable about a stationary shaft 103 which tens counter levers cooperate in a known manner by means of tens counter lugs 105, 106 with tens teeth 107 arranged at the adding and subtracting wheels, respectively. On pressing away the lug 105 or 106, respectively by a tens tooth 107 on the passing of the corresponding totalizer wheel from "9" to "0" or "0" to "9," respectively, the tens transfer will be prepared. Besides this the tens counter lugs 105, 106 act as abutments for the tens teeth 107, when the totalizer wheels being returned to zero by the actuating rods 48 in order to take the total.

*Storing mechanism.*—The third racks 67 (FIG. 2) likewise movable in slots at their actuating rods 48 and influenced by springs 108 cooperate with the storing mechanism 32. The latter consists of a set of mutilated storing wheels 109 which are rotatably mounted on a shaft 111, being a part of a rocking frame formed by two arms 112, the shaft 111 and a shaft 113 (FIG. 2) mounted in the intermediate walls 27, 28 (FIG. 3).

The storing mechanism will be, as is more fully explained later on, at the second half of each machine operation brought into engagement with the racks 67, takes up the shifting value of the actuating rods 48 and retains it in its again disengaged position up to the beginning of the next machine operation, where all its wheels are returned to zero by rocking of a cancelling rod 114 counterclockwise about the shaft 111.

The construction parts between the storing mechanism 32 and the set pin carriage 43, explained more fully later on, serve for the performance of the multiplication by the cooperation between the storing mechanism and the set pin carriage.

Figure 8:
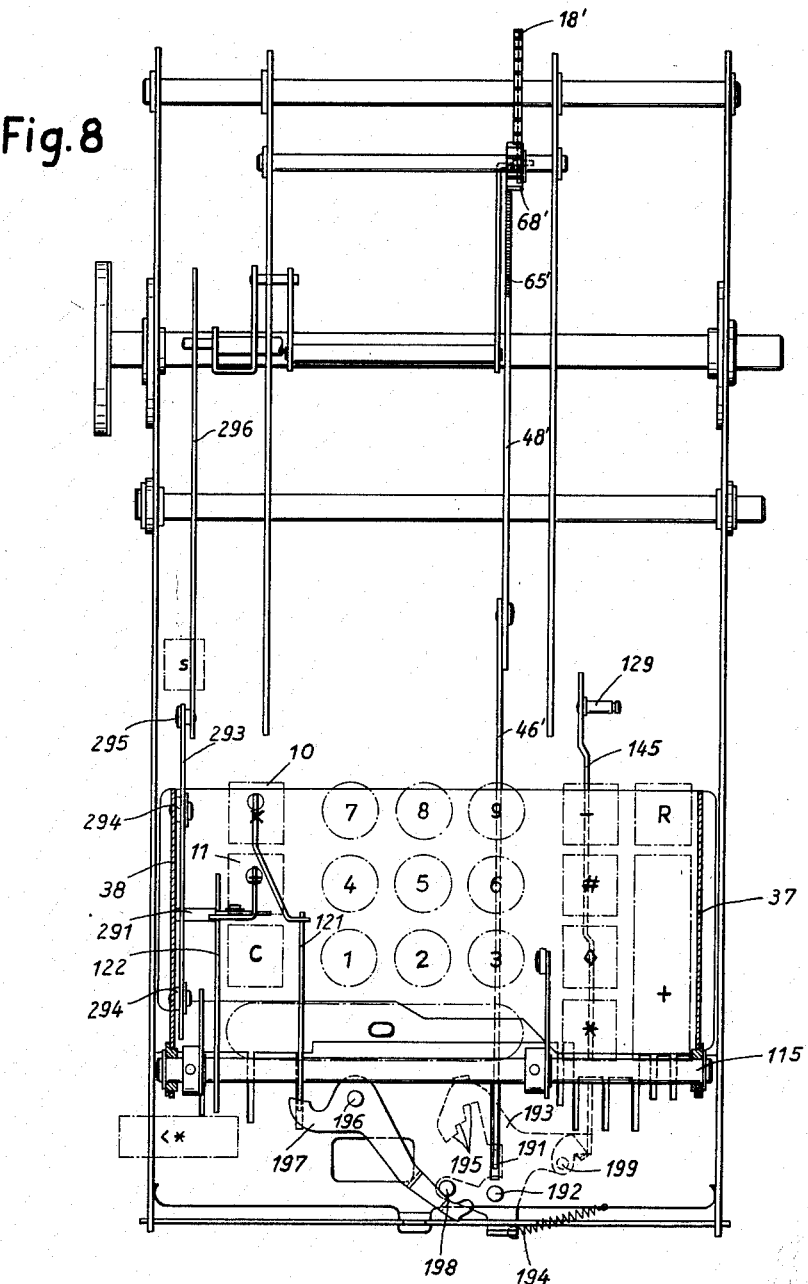
FIG. 8 is a plan view of the function setting means.
Figure 18:
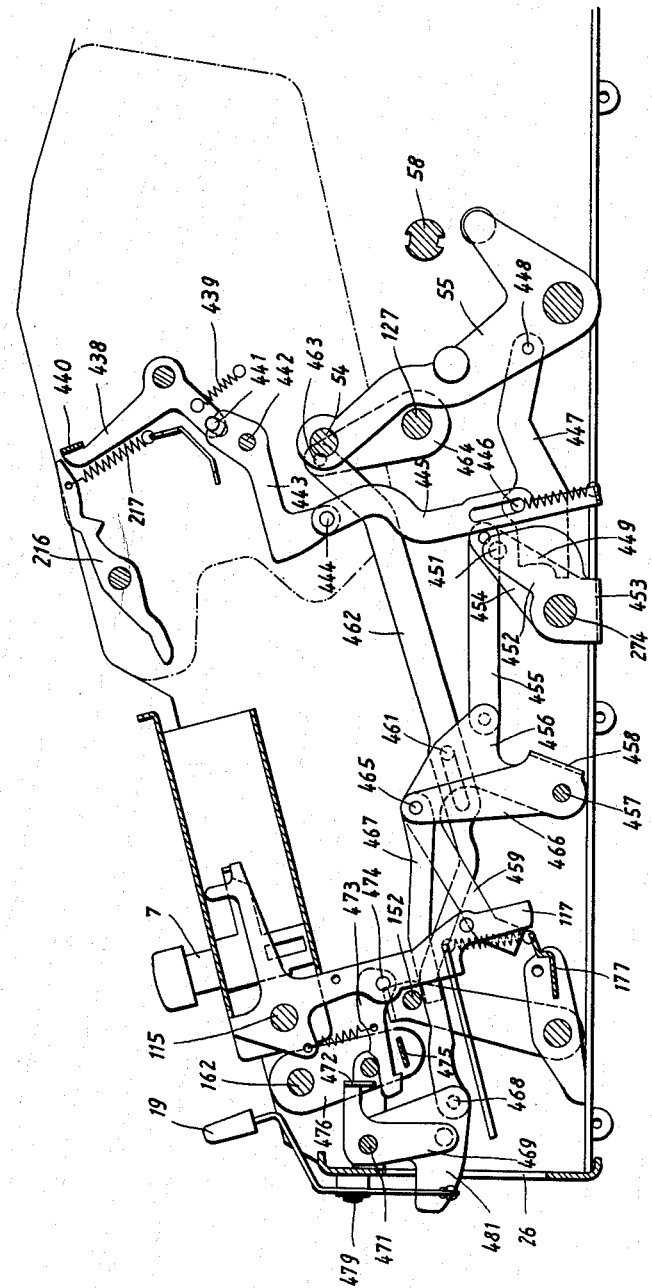
FIG. 18 is a side-elevation of the control members for the disengaging of the multiplication.
Figure 19:
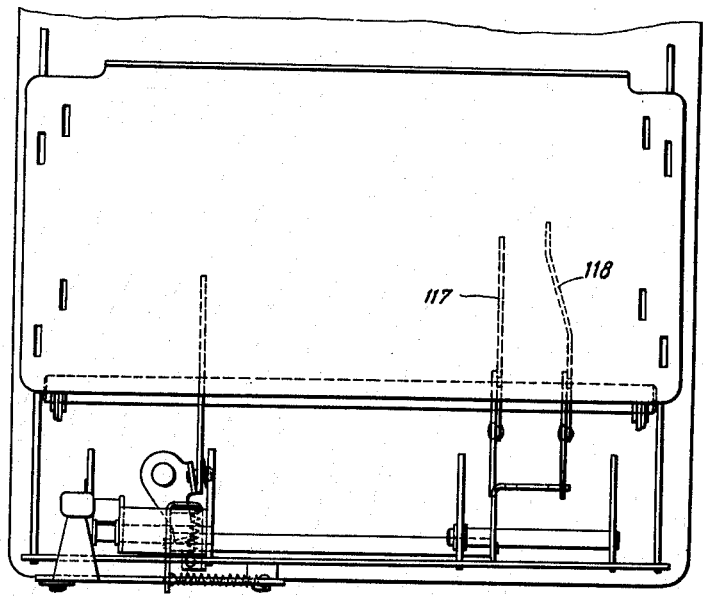
FIG. 19 is a plan view of the totalizing means for the multiplication.

*Function key levers.*—In the front end of the key frame 34 (FIG. 2, on the left) an axle 115 is located on which are rockably mounted the key levers influenced by the function keys, which on striking of the individual function keys influence the mechanism of the machine in a different manner. It is coordinated To the subtract key 4 the key lever 116 (FIG. 4)
To the total key 7 the key lever 117 (FIGS. 3, 18, 19)
To the non-add key 5 the key lever 118 (FIGS. 3, 19)
To the add key 3 the key lever 119 (FIG. 5)
To the multiplier-key 10 the key lever 121 (FIG. 8)
To the multiplicand key 11 the key lever 122 (FIG. 8) and
To the repeat key 9 the key lever 123 (FIG. 21).

*Totalizer-controlling.*—The drive for the engagement and disengagement of the totalizer 31 (FIG. 2) into and out of the actuating racks 65 is derived from the main drive shaft 58 (FIG. 4), whilst the control of the timing of the engagement and disengagement of the totalizer and its inverting from additive to subtractive actuating and vice versa on the individual functions of the machine will be performed by the related function keys through their key levers.

On the main drive shaft 58 cam discs 124 are secured which cooperate with roller levers 125, 126 rockably mounted on a totalizer controlling axle 127, having in their position of rest projections 128 beneath the about horizontal path of movement of a transversally directed coupling bolt 129. The coupling bolt is shiftably guided in longitudinal slots 130 of two arms 131 connected with each other and mounted on the totalizer controlling axle 127. One of the arms is rigidly connected with a backwardly directed projection 132 which straddles by means of its upper forked end 133 over a pivot 134 on a bell crank lever 136 mounted on a stationary pivot 135.

To the bell crank lever 136 a coupling pawl 137 is linked cooperating with a see-saw 139 to which a push rod 140 is linked. The push rod 140 cooperates by means of shoulders 141 with lugs 142 of the totalizer frame 95. The pawl 137 contacts, under the action of a spring 150, tensioned between the pawl 137 and the see-saw 139, by means of a projection 143 a coupling lug 144 of the see-saw 139. In this way, a detachable connection is created between the arm 132 and the push rod 140 engaging the totalizer 31 for disconnecting the engagement of the totalizer into the actuating racks 65 (FIG. 2), the purpose of which will be explained later on.

For the controlling of the engagement and disengagement of the totalizer the coupling bolt 129 is located at the end of a setting rod 145 which can be adjusted in dependence on the actuation of the function keys into four different positions within the slots 130. The bolt 129 cooperates with projections 128 of the above mentioned two roller levers 125, 126 in such a way that it will be rocked upwardly and back in a distinct sequence of time, when it is adjusted opposite one of said projections, whereby the totalizer frame 95 will be rocked by the action of the push rod 140 against one of the lugs 142 about its rocking axle 101 clockwise or counter clockwise, thereby bringing the adding wheels 98 or the subtracting wheels 99 into engagement with the racks 66 (FIG. 2).

*Adding and subtracting actuating.*—In order to adjust the push rod 140 into its adding and subtracting position, a pin 147 engages an opening 146 of the push rod 140, which pin is fixed at the end of a rod 148 linked to the key lever 116 (FIG. 4) for the subtract key 4 by means of a pivot 149. When the subtract key 4 is not depressed the push rod 140 assumes the position repesented in FIG. 4 in which it takes along with it the right lug 142 on the upwards movement bringing the adding wheels 98 in the engagement position with the actuating racks 65. When the subtract key 4 (FIG. 1) is depressed the push rod 140 (FIG. 4) will be rocked to the left through the setting rod 145 in cooperation with the lug 142 of the totalizer, so that it, on an upward movement per- formed under the mediation of one of the roller levers 126, 128, the coupling bolt 129, the pawl 137 and the see-saw 139 rocks the subtracting wheels 99 into the engagement position with the actuation racks 66 (FIG. 2).

*Motor-switching on.*—The releasing of the motor drive for the individual machine operations is performed by depressing one of the function keys 3 to 7 and 10 and 11 (FIG. 1) through the corresponding key lever. Therewith, a rod 152 extending across before lug faces 151 (FIG. 5) of the key levers, which rod together with arms 153 and an axle 154 form a rocking frame. This frame will be rocked counter clockwise by the coordinated key levers, whereby one of the arms 153 through a pin 155 removes a pawl 158 mounted on a stationary pivot 156 and being influenced by a spring 157 from a lug 159 of a lever 161, which is rigidly keyed to a stationary axle 162.

The released lever 161 and the axle 162 therewith rock clockwise, under the action of a spring not shown, and moves through a pin 163 and a rod 164 a catch pawl 165 of the motor coupling 166 out of engagement with a coupling member 167, so that the latter will be released and the coupling of the motor axle with the main drive shaft 58 can be performed in a known and not described manner. The catch pawl 165 therewith moves upwards and rocks a lever 168, linked to it, about its bearing pivot 169 counter clockwise, switching on the motor contact 172 through a rod 171 and rocking a lever 175 pivotally on a stationary pivot 174 through a pin 173. Therewith, the lever 175 frees a detent rail 177 loosely mounted on the axle 154 by means of arms 176 and cooperating with the key levers, which detent rail follows the action of its spring 178 upwardly, its locking face 179 directed nearly vertically is placed behind the lower vertical lug face 181 moved to the left in FIG. 5 of the just actuated key lever, whilst the right edge of the rail moves before the lower ends of the non actuated key levers, so that all key levers are locked in their working position or position of rest, respectively. At the end of the machine revolution or the corresponding operation, respectively, the coupling member 167 seizes the catch pawl 165 again and moves it downwards, whereon the levers 168 and 175 are rocked back into their home position and the detent rail 177 again frees the key levers. The rocked key lever will be restored into its home position under the action of its spring 182. The frame arm 153 follows the key lever through the rod 152 which frame arm 153 rocks the pawl 158 against the action of the spring 157 clockwise into the home position, the pawl 158 moves again before the lug 159 of the lever 161 which has been already restored into its home position by a leverage, not shown, and being retained in this position. At the same time the motor contact 172 had been opened by the lever 168 through the rod 171 and the motor stopped.

*Line spacing.*—For actuating the line spacing lever 83 (FIG. 5) for the platen 80, on a stationary cross rod 183 a roller lever 184 is rotatably mounted which straddles a cam disc 185 of the main drive shaft 58. In a longitudinal hole of the roller lever 184 the actuating pawl 88 is linked by means of a pivot 185 which pawl is pulled against a stationary guide edge 188 beneath the platen 80 by a spring 187. During the machine operation the roller lever 184 is rocked clockwise, the actuating pawl 88 being drawn to the right by its spring 187 and at the same time gliding upwards and coming into mesh with the teeth of a ratchet wheel 180 of the platen 80. After termination of the printing operation the roller lever 184 is rocked back into its home position and the actuating pawl 88 turns further the platen 80 clockwise by one line space. After that the actuating pawl 88 will be disengaged again out of the teeth of the actuating wheel 180 by the guiding edge 188.

*Sign printing.*—On the printing of negative items, numbers, multipliers, multiplicands, sub-total, totals and products, the function signs will be printed on the right hand side of the value print on the paper strip, which function signs are represented in the function keys 4 to 7 and 10 to 11 in FIG. 1. For this purpose, on the right of the type segment 18 for the unit order (FIG. 3) a type segment 18' (FIG. 8) for the function type is mounted on a type hammer lever 72' in the same manner as the digit type segments 18 (FIG. 2). The type segment 18' (FIG. 8) cooperates with an intermediate wheel 68' being in mesh with a rack 65' of a sign actuating rod 48' which is shiftably mounted in its longitudinal direction on the same square rods 49 (FIG. 2) on which the value actuating rods 48 are mounted, cooperating with the restoring rod 84 in the same manner as the amount actuating rods.

To the sign actuating rod 48' a lever 46' (FIG. 8) is linked cooperating by means of its front end (in FIG. 8 lower end) by a projecting nose 191 with a function setting plate 193 rockably mounted on a stationary pivot 192. This setting plate will be adjusted against the action of a spring 194 on depressing of one of the above mentioned function keys into a determinated angular position, in which a distinct step lug 195 is opposite the nose 191. For this purpose, for instance, the key lever 121 (FIG. 8) of the multiplier key 10 acts by means of an intermediate lever 197 rotatably mounted on a stationary pivot 196 onto a pin 198 of the setting plate 193.

At the setting plate 193 also the setting rod 145 is linked (see also FIG. 4) by means of a pivot 199 which at its other end carries the coupling bolt 129 for the engagement and disengagement of the totalizer, so that by adjusting the setting plate at the same time also the coupling bolt 129 arrives at the adjusting position corresponding to the depressed function key.

3. Idle Running, Storing and Repeating of the Storing Mechanism

*Idle running.*—The storing mechanism 32 (FIG. 2) during the restoring of the actuating rods 48 by the restoring rod at the second half operation of the machine, is usually engaged into the racks 67 (see column 6) and retained, disengaged from them after having received the value amount of the actuating rods, and restored to zero in disengaged state, during the first half of the following operation of the machine, in order to take up the new setting value of the actuating rod at the second half of this operation of the machine, and finally to cancel the same in the first half of the following operation of the machine.

This operation of the storing device occurring on usual adding and subtracting and total taking actuations is an idle running, effecting no actions onto the other mechanisms of the machine or the results of the calculation. It only aims at keeping ready the storing device for the performance of distinct calculation operations, namely the storing, the repeating and the multiplication.

The engagement and disengagement of the restoring mechanism will be prevented, different from the explained idle running operation of the storing device, or effected at other points of time. Likewise its zero clearing will be prevented or performed in an other manner.

For the engagement and disengagement of the storing mechanism into and out of the racks 67 (FIG. 2) of the actuating rods 48 the above described rocking frame rocking about the stationary shaft 113 (FIG. 2), consisting of the storing mechanism shaft 111, the arms 112 and the shaft 113, is provided with an arm 201 (FIG. 7) keyed to the shaft 113. This arm engages by means of a roller 202 into a cam slot 203 of a cam lever 205 being under the action of a spring 204.

The latter is rotatably mounted on a stationary rod 206 and connected to a coupling lever 208 by means of a pivot 207, which coupling lever engages with a lug 209 at its free end a bent over ear 211 of a lever arm 212 under the action of a spring 213.

The lever arm 212 is keyed on the above mentioned totalizer control axle 127; which is rocked clockwise by the main drive shaft 58 by means of suitable connection means at the beginning of the second half of the machine operations and at the end of the machine operation counterclockwise. In the position of the described parts represented in FIG. 7 the storing mechanism 32 (FIG. 2) is disengaged out of the racks 67. When the lever 212 (FIG. 7) is rocked clockwise the cam lever 205 will be likewise moved clockwise and its cam slot 203 rocks the arm 201 and therewith the storing mechanism counterclockwise so that the storing wheels 109 (FIG. 2) engage the racks 67. On the rocking back of the shaft 127 (FIG. 7) counterclockwise the storing mechanism will be lifted out of the racks 67 by means of the same connection means.

Figure 6:
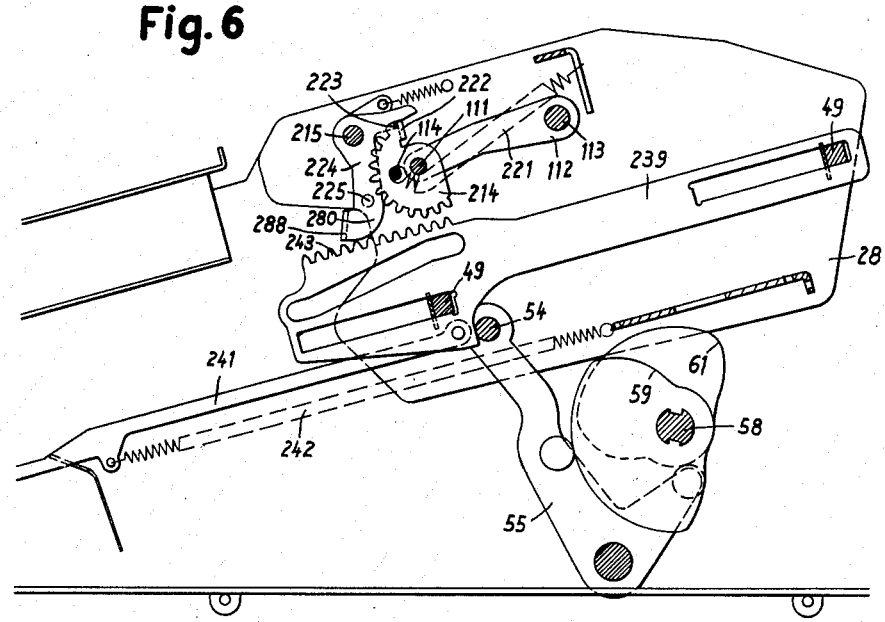
FIG. 6 is a side-elevation of the clearing device for the storing mechanism.

For the cancellation of the storing mechanism normally effected at the beginning of the first half of each machine operation, at the left end (FIG. 3) of the storing shaft 111 (FIG. 6) a cancelling segment 214 is rigidly secured. Further, on a stationary mounted axle 215 (FIG. 2), locking levers 216 are mounted, drawn by means of springs 217 with wedge shaped lugs 218 against the circumference of the storing wheels 109 lockingly engaging either, in a digital position of these wheels into the tooth gaps or, in the zero position of the wheels, into notches 219 located in the non-toothed circumference portions of the wheels.

The above mentioned cancelling rod 114 is carried at its one end by the cancelling segment 214 (FIG. 6), at its other end by a rigid arm of the axle 111 and forms together with these members a rocking frame urged counterclockwise by a tension spring 221. This rocking frame being urged by a bent over ear 222 of the cancelling segment against a lug 223 of a locking lever 224, loosely mounted on the axle 215. By means of a pivot 225 a pawl 226 (FIG. 7) is linked to the locking lever 224 (FIG. 6), the pawl nose 227 (FIG. 7) of which cooperates with a bent over ear 228 of a lever 231 rotatably mounted on a stationary pivot 229, into which lever 231 engages by means of a roller 232 a lever 233 mounted on a rod 206. This lever 233 will be oscillated by a roller lever 235 embracing a pair of cams 234. At the first half of the machine operation, the bent over ear 228, when rocked to the right, seizes the nose 227, moves the pawl 226 to the right, and rocks the rocking lever 224 by means of the pivot 225 counterclockwise, whereby the cancelling segment 214 (FIG. 6) together with the cancelling rod 114 will be released and rocked counterclockwise under the action of the spring 221. Therewith the cancelling rod 114 takes along with it all storing wheels 109 not being in their zero position, into the zero position, in which the individual storing wheels 109 (FIG. 2) contact by means of pins 236 a comb 237, the locking levers 216 (FIG. 2) lockingly engaging the notches 219 of the storing wheels.

The cancelling rod 114 extends through semi-circular angular slots 238 (FIG. 2) of the storing wheels 109. These slots are made so long, that the storing wheels 109 are enabled to move clockwise by ten actuating units, when the cancelling rod 114 is to be found in its home position represented in FIG. 2. As is evident, the cancellation of the storing wheels takes place on the idle running of the storing device, when they are out of engagement with the actuating rods.

In order, now, to return again the released cancelling rod into its home position, the cancelling segment 214 (FIG. 6) has coordinated to it a restoring rail 239, mounted on the square rods 49, being influenced in the same manner as the actuating rods 48 (FIG. 2) through a linked lever 241 and a spring 242 by the restoring rod 54 and cooperating by means of teeth 243 with the cancelling segment 214.

When the locking lever, in the first half of the machine operation releases the cancelling segment 214 by being moved counterclockwise, the cancelling segment 214 will be rotated counterclockwise by its spring 221 wherewith the cancelling rod 114 restores all displaced storing wheels 109 into their zero position, in which the individual storing wheels 109 (FIG. 2) are stopped by a comb 237 by means of pins 236.

In the first half of the machine operation the restoring rod 54 (FIG. 6) will be rocked to the right, the restoring rail 239 follows this movement under urging of the spring 242.

At the second half of the machine operation the storing mechanism will be lowered by the arms 112, wherewith the cancelling segment 214 will be engaged into the teeth 243, so that it will be returned into its home position to the left under taking along the cancelling rod 114 on the returning of the restoring rod 54, in which home position the bent over ear 222 is moved behind the lug 223 of the locking lever 224.

*Storing.*—When a value contained in the storing mechanism 32 is to be stored during any number of following machine operations, during this storing time, it is necessary to prevent both the engaging of the storing mechanism and its cancellation during the first half of the machine operation.

For this purpose the storing lever 13 (FIG. 7) will be shifted to the right until it engages with a notch 244 over a stationary pin 245, being retained in this position by a spring 246. Its downwardly directed arm 247 therewith rocks a lever 249 rotatably mounted on a stationary pivot 248, which lever 249 by means of a slot 251 opens at its lower end of a flange 252 of its arm directed to the right, seizes over the above mentioned coupling lever 208, moving it downwardly out of the range of the bent over ear 211 of the lever 212, whereby the storing mechanism will be disconnected from the engaging drive of the lever 212.

At the same time a lever 254 will be rotated counterclockwise by an upper bent over ear 253, which lever 254 engages into an oblong hole 256 of the pawl 226 by means of a pin 255 displacing it in the same direction. The pawl 226 is moved out of the working range of the lever 231, whereby the cancellation of the storing mechanism will be disengaged during the first half of the machine operation, so that the amount originating from the last machine operation remains stored in the storing mechanism.

Figure 7:
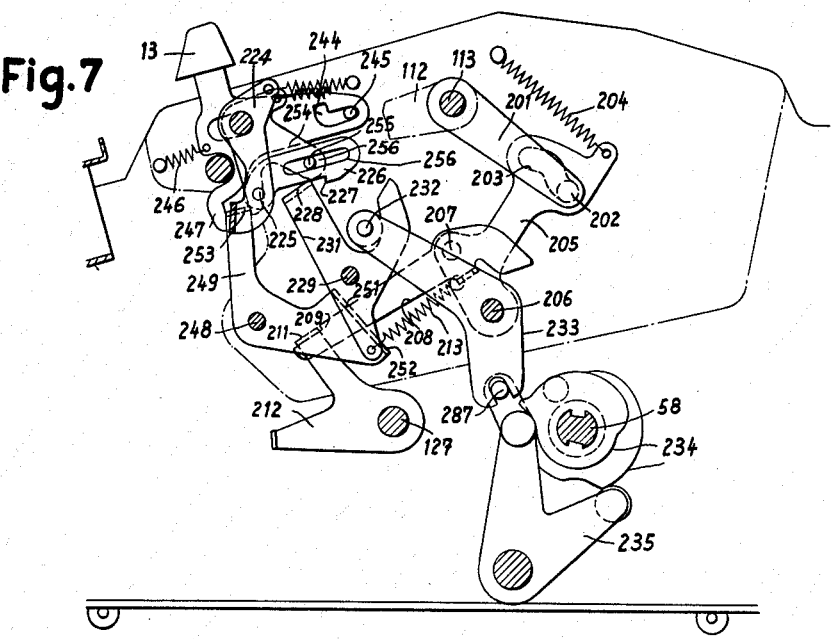
FIG. 7 is a side-elevation of the engaging and disengaging means for the storing mechanism.

When, now, the stored value is to be used again, the storing lever 13 will be returned into its home position represented in FIG. 7, wherewith the pawl 226 will be brought again into the working range of the lever 231 and the coupling lever 208 into the working range of the lever 212. Then, the repeat key 9 (FIG. 1) will be depressed and the machine operation will be released by the add key 3 or subtract key 4, according as the stored value is to be transmitted additively or subtractively to the totalizer.

Therewith, it is important to transmit this amount according to a total taking operation to the actuating rods 48, i.e. the storing mechanism must be engaged into the actuating rods already before the beginning of the movement of the actuating rods to the right. To this end, on depressing the repeat key 9 (FIG. 21), a rod 257 will be drawn to the front of the machine in FIG. 21 to the left, through the key lever 123 (FIG. 21), which rocks clockwise a lever 261 mounted on a stationary pivot 259 by means of a pin 258, which lever 261 moves downward a rod 263 linked by means of a pivot 262, which is guided by a pivot 265 of the above mentioned roller lever 126 and engaging into an oblong hole 264. Therewith, a nose 266 of the rod 263 moves before a pin 267 of an arm 268, which is rigidly secured on the totalizer controlling axle 127, so that the total roller lever 126 rocks over the nose 266 and the pin 267 the arm 268 and with it the totalizer controlling axle 127 clockwise, so that the storing mechanism will be engaged into the actuating rods 48, already before the beginning of the movement of the actuating rods 48 (FIG. 2) towards the right. By the left arm of the lever 261, on depressing the repeat key 9, an arm 271 linked to it by means of a pivot 269 and guided by a pin 272 will be lifted and moved with a lug before a pin 273 of a lever 275 mounted on a shaft 274, which arm 271 cooperates by means of a push cam 276 with a roller 277 of a bail 278, said roller 277 guiding the levers 46 (FIG. 2) linked to the actuating rods 48.

The pin 258 (FIG. 21) of the lever 261 engages into an open slot of a disc 279 rotatably mounted on the totalizer controlling axle 127, which cam engaging by means of an oblong hole of a rod 282. The rod 282 is linked to the above mentioned pin 255 (see also FIG. 7) and by its upward movement it holds the pawl 226 out of the range of the lever 231 thereby disconnecting the cancellation of the storing mechanism at the first half of the machine operation in the same manner as if the storing lever 13 (FIG. 7) would have been moved to the right.

A rod 283 (FIG. 21) is linked, at its left end, by means of a pivot 284 to a link 285, being mounted on a stationary pivot 286. At its right end the rod 283 is linked to a pivot 287 of the roller lever 235 over which also engages the lever 233 (FIG. 7). At the beginning of the machine operation the roller lever 235 will be rocked counterclockwise, whereby it strikes with the rod 283 (FIG. 21) through the pin 272 and the lever 271 against the lug 273, and through the lever 275, its push cam 276 and the roller 277 rocks the bail 278 downwards, whereby the latter moves the levers 46 linked to the actuating rods 48 (FIG. 2) together with their actuating noses 45 out of the range of the ends 44 of the set pins, so that on the movement of the restoring rod (FIG. 2) the actuating rods 48 and their racks 67 will be moved to the right under the action of the springs 51 and under rotation of the storing wheels 109 (FIG. 2) until the individual storing wheels with their pins 236 strike against the comb 237 and stand in their zero position. With it, the value introduced into the actuating rods 48 from the storing wheels will be transmitted into the printing device 29 through the racks 65 and the intermediate wheels printed on to the paper strip 14. At the second half of this machine operation then the adding wheels of the totalizer 31 will be engaged into the racks 66 in the described manner, so that on restoring the actuating rods 48, the value contained in them will be transmitted to the totalizer 31 and at the same time transmitted back to the restoring mechanism 32.

When, therewith, the value taken from the storing mechanism is to be transmitted subtractively, the subtract key 4 will be depressed, together with the repeat key 9, whereby the pestle 140 will be rocked to the left by the subtract key lever 116 (FIG. 4) through the rod 148, so that on the upward movement of same the subtracting wheels 99 come into engagement with racks 66.

On the described returning of the storing wheels 109 (FIG. 6) by the cancelling rod 114, the locking levers 216 (FIG. 2) for the individual storing wheels are lifted by a bail 270 mounted on the axle 215. This bail will be taken along on rocking the locking lever 224 (FIG. 6) counterclockwise by means of its downwardly directed arm 289 by a bent over ear 288 of the locking lever 224, rocking the locking lever 216 on striking against the lugs 218 (FIG. 2).

*Repeating.*—The circumstance, that each value calculated by the machine in a machine operation, be it an amount, item or a total, remains in the storing mechanism until the beginning of the next machine operation opens the possibility to introduce it again into the actuating rods at the next machine operation, in order to transmit it additively or subtractively on to the totalizer in order to add or subtract the same amount as often as desired or to eliminate an incorrectly set up amount.

For repeating an amount only depressing of the repeat key 9 and in connection therewith the depressing of the add or subtract key 3 or 4, respectively, is necessary. Therewith, the same machine operations will be performed as they are described above in connection with the "storing," when subsequent to the storing after returning the storing lever 13 the repeat key 9 is depressed and the machine operation released by the add or subtract key.

As described, therewith, already before the movement of the actuating rods 48 to the right the storing mechanism 32 (FIG. 2) will be brought into engagement with them and the cancellation of the storing device will be stopped. On the releasing of the actuating members 48 by the restoring rod 54 the springs 51 of the actuating rods draw the storing wheels 109 into the zero position represented in FIG. 2, whereby the amount contained in the storing mechanism will be transmitted to the actuating rods 48.

The movement of the actuating rods will be limited by abutting of the pins 236 on the comb 237.

During the returning of the actuating rods 48 by rocking back the restoring bar 54 both the totalizer 31 and the storing mechanism 32 being in mesh with the racks 66 and 67, respectively, so that the value taken from the storing mechanism will be transmitted additive or subtractive on to the totalizer and will be again brought back to the storing mechanism.

The value then may be repeated in any number of following machine operations, as often as the repeating key 9 will be depressed, that means, it will be correspondingly often transmitted on to the totalizer. When on the releasing of a following machine operation depressing of the repeating key 9 does not take place at the beginning of this machine operation the storing mechanism will be automatically cancelled, working further in the described manner in idle running.

4. Multiplication

*Operation sequence of the automatic multiplication.*—In order to perform a multiplication at first the multiplier will be set in the digit keys 1 (FIG. 1). By subsequent depressing of the multiplier key 10 a machine operation will be started in which the set up multiplier will be printed and at the same time transmitted to the storing mechanism, but not to the totalizer. Besides this the sign "X" will be printed adjacent to the multiplier. Hereupon the multiplicand will be set up in the digit keys 1 and by depressing the multiplicand key 11 a series of machine operations will be released, in the introducing first machine operation of which the multiplicand will be taken from the adjusted set pins by the actuating members 48 (FIG. 2) and transmitted to the type segments 18 and printed together with a "=" sign. Therewith, storing mechanism and totalizer remain disengaged from the actuating rods so that the multiplicand will not be introduced into them.

On this operation of the machine also the multiplication controlling mechanism will be prepared for the now following repeated addition of the adjusted multiplicand according to the individual digits of the multiplier contained in the storing mechanism, under shifting the multiplicand from order to order with respect to the totalizer, in that on disengaging the normal step by step moving device, the set pin carriage will be coupled with the multiplication controlling mechanism which senses the storing mechanism and the storing wheels 109 and returning them denominationally. By this coupling, there will be effected also that the set pin carriage, at the end of the introducing machine operation will not be returned into its home position by the spring 62 (FIG. 3), but remains in its position received on the setting of the multiplicand and that it, at the following machine operations of the repeated addition will be shifted from order to order further to the left (FIG. 3). At the end of this machine operation introducing the multiplicand the motor drive will not be disengaged. Its engagement will be maintained for the following machine operations performing the repeated addition, will be prepared so that without particular depressing of a function key, automatically further machine operations follow serving for the repeated addition of the multiplicand, follow. Further, disengaging of the printing mechanism during the machine operation for the repeated addition will be prepared. At the end of the introducing machine operation also the engagement of the totalizer into the actuating rods will be prepared, so that the totalizer on the following machine operations for the repeated addition takes up the partial product and the end products. The storing mechanism containing the multiplier remains during this introducing machine operation and during the following machine operations of the repeated addition disengaged from its actuating racks 67.

During the performance of the repeated addition of the multiplicand the set pin carriage arrives together with the multiplication controlling mechanism from its transversal shifting position received on the setting of the multiplicand from order to order up to its outermost left position (FIG. 3), in which the storing wheel 109 (FIG. 2) of the highest order will be sensed from the multiplication controlling mechanism. When this highest storing wheel 109 stands on "0" or has been actuated to "0," at the end of this last machine operation of the repeated addition the multiplication control mechanism will be changed in such a manner that on the now following machine operation, the storing mechanism will be normally cancelled and disengaged from the set pin carriage and the totalizer controlling will be changed to total taking, so that in this machine operation following to the last machine operation of the repeated addition at the second half of the machine operation the product will be printed on the paper strip and transmitted on to the storing mechanism.

At the end of this machine operation the set pin carriage and the multiplication controlling mechanism return under disconnecting from each other into their home positions. The motor drive will be switched off at the end of the machine operation, so that the machine will be ready for another calculating operation.

Now the performance of the above mentioned different machine operations during the automatic multiplication is to be described more fully in detail in connection with the calculation of the numeral example:

$$439 \times 23 = 10,097$$

*Setting up of the multiplier.*—It will be assumed that the machine is in its position of rest, i.e. the totalizer 31 (FIG. 2) the storing mechanism 32, the type segments 29 are in their zero position and the totalizer and storing mechanism out of engagement with the racks 65 and 67, respectively. The set pin carriage assumes its outermost right hand position represented in FIG. 3, in which the outermost lefthand row of set pins 41 registers with the line 40 along which the digit keys 1–8 are acting.

Figure 13:
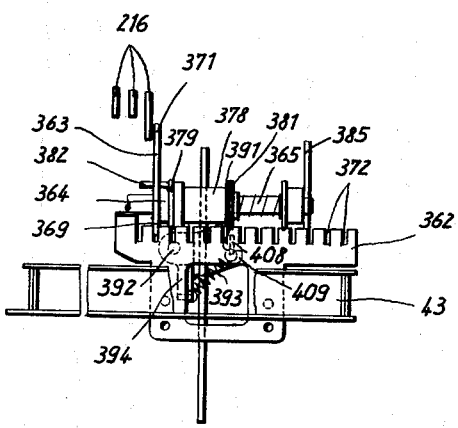
FIG. 13 is a partial front view of the step by step actuating rail of the set pin carriage with coupling members of the multiplication.

The coupling segment 363 (FIG. 2) is out of mesh with the coupling rail 362 and is held in its lateral home position by the locking lever 394 (FIG. 13).

The factor "439" being considered as multiplier will be first introduced by subsequently depressing the related digit keys 1–9 beginning with the digit 4. Thereby the pin carriage is moved by three steps to the left and the respective set pins 41 are set in the three left hand rows.

Subsequent thereto the multiplier key 10 is depressed which causes (1) The adjustment of the sign set plate preparing the print of the sign X, (2) The movement of the coupling bolt 129 into the position 129' (FIG. 4) in which the engagement of the totalizer is disconnected.

(3) Switching on the motor drive by means of the key lever 121 whereby the machine operation will be released.

On depressing the multiplier-key 10 (FIG. 1) through the key lever 121 (FIG. 8) and the intermediate lever 197 the sign set plate 193 will be rocked in such a manner that the left step 195 of this plate associated with the sign "X" of the sign type segment 18' will be placed into the path of the nose 191 of the rod 46'.

Figure 4:
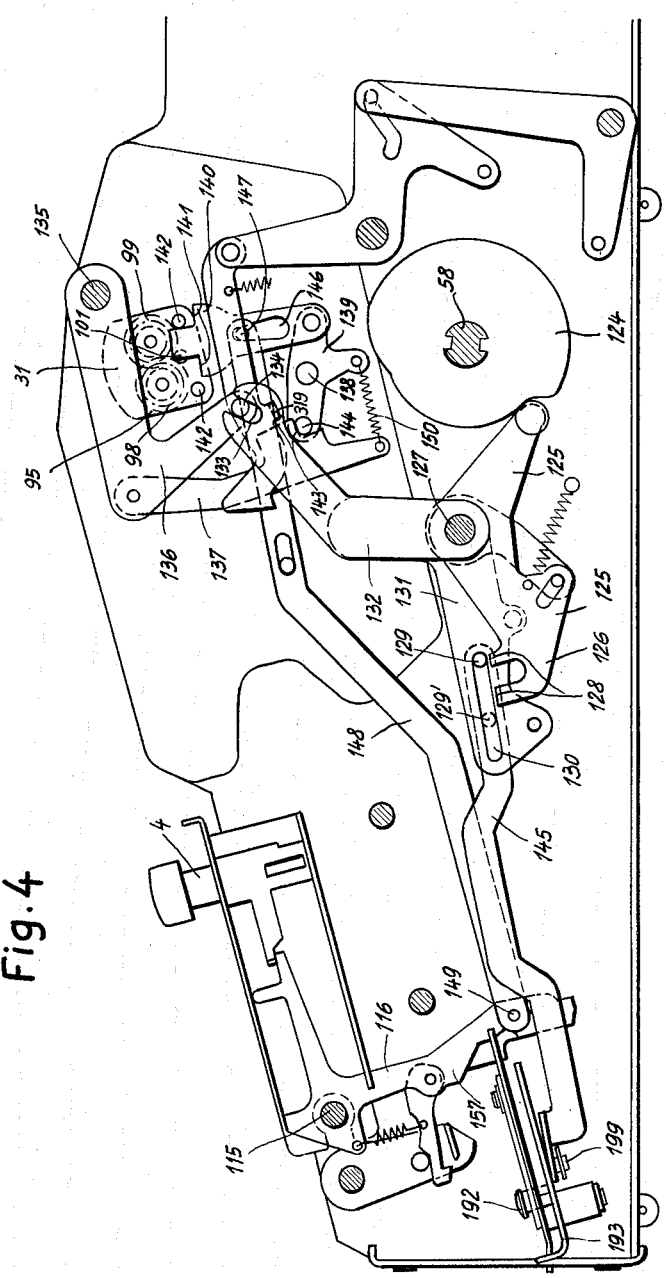
FIG. 4 is a side-elevation of the totalizer controlling means.

By the rocking of the set plate 193 at the same time the coupling bolt 129 will be adjusted into the position 129' shown in FIG. 4 by dotted lines through the set rod 145 in which the coupling bolt 129 lies out of the acting range of the projections 128, so that the totalizer 31 remains disengaged from its actuating racks during this machine operation, i.e. the multiplier will not be transmitted to the totalizer.

Through the key lever 121, the rod 152 (FIG. 5) and the rod 164 the motor drive will be switched on and the machine operation released. At its beginning, the cancelling rod 114 (FIG. 6) of the storing mechanism will be released in the described manner, so that the storing wheels 109 (FIG. 2) are adjusted to "0" and locked in this position by the locking levers 216 (FIG. 2). Then the actuating rods 48, 48' will be released by rocking the restoring rod 54 to the right. The actuating rods are positioned according to the set up set pins 41, 44 to the multiplier according to the depressed keys 1, or to the sign "X," respectively. Subsequently thereto, at the end of the first half of the machine operation the printing of the multiplier together with the sign "X" follows, and the engagement of the storing mechanism disconnected at the beginning of the machine operation into the racks 67 and then the restoring of the actuating rods by the restoring rod 54 into the home position will be effected, wherewith the multiplier will be transmitted to the storing mechanism. The disengaged totalizer 31 remains uninfluenced. Then the set pin carriage will be returned to its right home position according to FIG. 3 and the motor drive will be switched off by the device represented in FIG. 5.

*Introducing of the multiplicand.*—Now the multiplicand, the number 23, will be set up in the keys 1, wherewith the set pin carriage will be shifted by two steps to the left (FIG. 3) corresponding to the number of orders of the multiplicand. By depressing then the multiplicand key 11 a machine operation introducing and preparing the repeated addition will be released, in which the multiplicand together with the sign "=" will be printed and all preparations necessary for the performance of the repeated addition will be made. For preparing the print of the sign "=" the key lever 122 (FIG. 8) engages by means of a pin 291 an oblique slot 292 (FIG. 9) of a slide 293, shiftably mounted on stationary pins 294, shifting it to the right.

Figure 9:
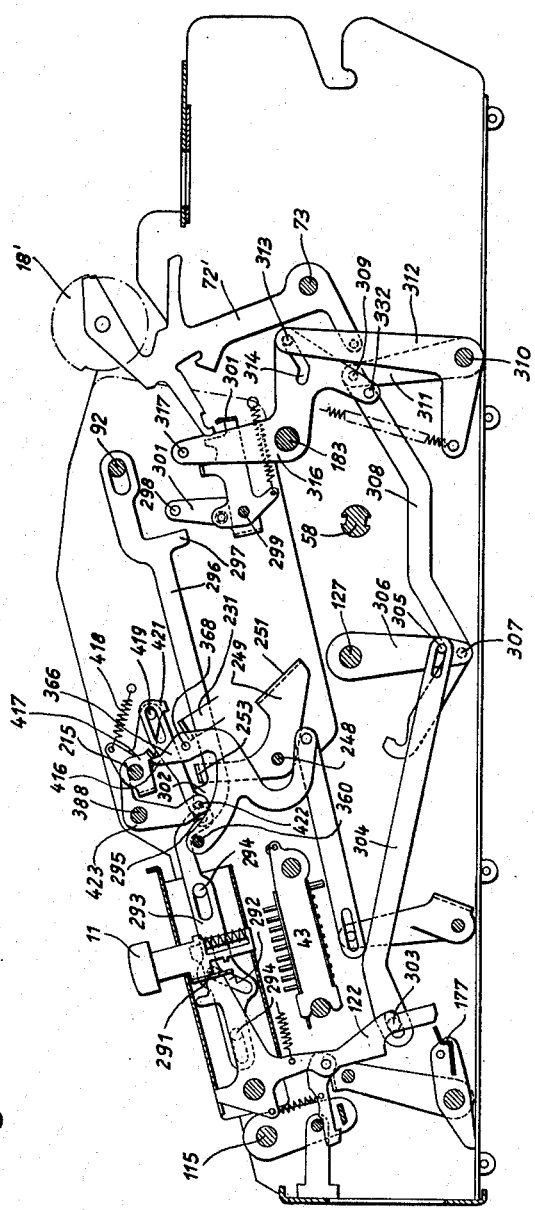
FIG. 9 is a side-elevation of the control-means attached to the multiplicand key.

Therewith a rod 296 linked by a pivot 295 at the right end of the slide 293 and guided on the shaft 92 at its other end will be shifted to the right (FIG. 9). The rod 296 strikes with a finger 297 against a pin 298 of a locking lever 301 for the sign type segment 18' mounted on an axle 299 and belonging to the zero print mechanism for the type hammer lever 72'.

Said rod 296 retains the locking lever 301 in its releasing position for the type hammer lever 72' represented in FIG. 9, so that the print of the sign "=" which takes place together with the print of the multiplicand is prepared.

For the disengagement of the storing mechanism the slide 293, on its movement to the right, rocks at the same time by means of a lug 302 the lever 249 clockwise, whereby, as explained in connection with FIG. 7, the lever 249 removes the coupling pawl 208 from the bent over flange 211 of the lever 212, whereby the engaging movement of the storing mechanism 32 in its racks 67 will be prevented.

For the disengagement of the totalizer during the introducing machine operation and the preparation of its engagement during the machine operations of the repeated addition the key lever 122 in FIG. 9 of the multiplicand key 11 rocked clockwise, takes along to the left by means of a pin 303 a rod 304 linked to it by means of an oblong hole, which rod 304 at the other end engages with an oblong hole over a pin 305 of an arm 306 rotatably mounted on the totalizer controlling axle 127 rocking the arm clockwise, whereby a rod 308 linked to a pin 307 of the arm 306 likewise will be displaced to the left.

The rod 308 is connected through a pin 309 with a lever 311 secured to a shaft 310 and with a lever 312 likewise secured on the shaft 310. The lever 312, on depressing the key 11, will be rocked counterclockwise; it engages by means of a pin 313 into a cam slot 314 of a lever 316 rotatably mounted on the shaft 183 and rocks it counterclockwise, displacing a rod 318 to the left linked to it by means of a pivot 317 (FIG. 10), which rod 318 cooperates by means of a bent over ear 319, with the already above mentioned couple pawl 137 belonging to the engaging mechanism for the totalizer (FIG. 4).

The couple pawl 137 will be pressed so far to the left by the bent over ear 319 (FIG. 10) that it with its projection 143 comes out of engagement with the pin 144 of the see-saw 139, so that the totalizer 31 (FIG. 2) also on this introducing machine operation, serving to the printing of the multiplicand will not engage into the actuator rods 48.

From the foregoing it will be evident that, during the introducing machine operation, released by depressing the multiplicand key 22, the multiplicand "23" and the sign "=" will be printed, whilst the multiplicand will not be added into the totalizer and not transmitted to the storing mechanism. During this introducing machine cycle further the following control operations for the performance of the repeated addition will have taken place:

(1) Reengaging of the totalizer,
(2) Retaining the actuating rods on the right of the multiplicand,
(3) Suppressing the printing of the repeated additions.

*To (1).*—The coupling pawl 137 (FIG. 4) moves, driven by the arm 132, downwards with its projection 143 (FIG. 10) past the pin 144, and in its lowermost position it snaps under the action of the spring 150 with its projection 143 below the bent over ear 319 taking along, on its upwards movement, the rod 318 which is in its position displaced to the left.

In its uppermost position the couple pawl 137 can glide to the right below the bent over ear 319 and can again move with its projection 143 over the pin 144, so that for the following machine operations of the repeated addition the device for the engagement and disengagement of the totalizer into the actuating rods being again effective.

Figure 17:
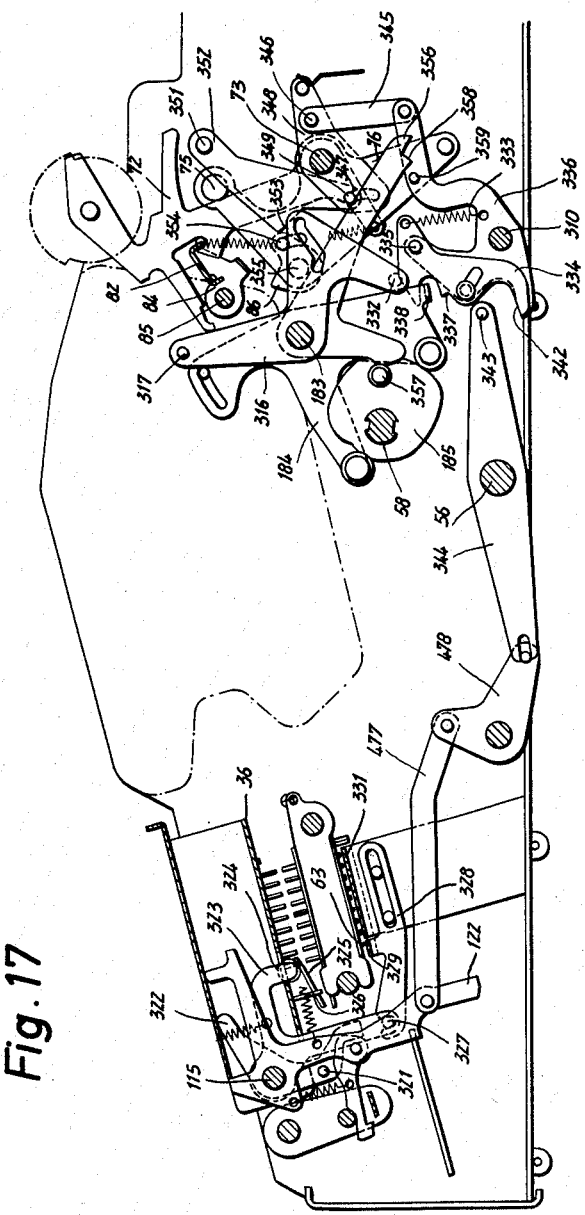
FIG. 17 is a side-elevation of control means for the printing mechanism and the set pin carriage.

*To (2).*—On the performing of the repeated addition it is necessary to bring the zero set pins 63 (FIG. 17) just being on the right of the multiplicand into there active position in order to retain the actuating rods 48 (FIG. 2) being on the right adjacent the multiplicand in their position of rest. To this end on depressing the product key 11 levers 322, 323 rigidly secured to the axle 115 will be rocked clockwise by the key lever 122 (FIG. 17) of the product key 11 through a pin 321, whereby a roller 324 rocks downwards a rocking rail 325 extending along the set pin rows of the set pin carriage, mounted in a web sheet 326 of the lower cross plate 36 of the key frame. Therewith, all zero set pins 63 situated on the right of the adjusted multiplicand will be moved downwards into the active position. At the same time a slide 328 will be shifted to the left by a pin 327 of the lever 323. On this a part 329 determined for the zero set pin 63 of the running up rail 331 for the set pins is fixed, whereby the adjusting of the zero set pins on the right of the multiplicand into the working position will be enabled.

*To* (3).—Whilst on the introducing machine operation for the repeated addition the printing mechanism will be actuated for the printing of the multiplicand, this printing will be suppressed during the machine operations for the repeated addition. For this purpose, on the rocking of the lever 316 (FIG. 9) counterclockwise by the lever 312, a pin 332 (FIG. 17) secured to the lower arm of the lever 316 frees a pawl 334 urged by a spring 333, being rotatably on a lever 336 which is mounted on a pivot 310.

The pawl 334 moves under the action of its spring by means of a nose 337, when released by the pin 332 against a bent over ear 338 of the roller lever 184 rotatably mounted on the shaft 183, said roller lever 184 cooperating with a cam disc 185 secured on the main drive shaft 58. The lever 336 is located with its arm 342 in the path of movement of a pin 343 of a lever 344 rotatably mounted on the shaft 56, the purpose of which will be explained later on.

To a right arm of the lever 336 a link 345 is linked, which through a pivot 346 is connected with a lever 348 provided with a cam slot 347. The lever 348 is rotatably mounted on the bearing rod 73.

A pin 349 of a disconnecting lever 352 rotatably mounted on a stationary pivot 351 engages into a cam slot 347, which lever 352 cooperates by an edge 353 with a pin 354, which is carried by the above mentioned latch 86 for the releasing of the type hammer levers which, by means of a pivot 355, is mounted on the lever 76 carrying the restoring bar 75. A lever 356 rotatably mounted on the shaft 183 cooperates by its left arm with a roller 357 of the cam disc 185. Its right arm cooperates by a notch 358 with a pin 359 which is fixed on the lever 336.

During the introducing machine operation released by the multiplicand key the roller lever 184 will be rocked clockwise, whereby its bent over ear 338 glides off the joining nose 337 of the pawl 334, following further the pull of its spring 333 and moving with its nose 337 before the bent over ear 338, so that the roller lever 184, on rocking back after the printing operation with its bent over ear 338, rocks the lever 336 clockwise through the nose 337. The lever 336 rocks in its turn by means of the rod 345 the lever 348 clockwise, whereby the cam slot 347 through the pin 349 puts the lever 352 with its edge 353 before the pin 354 of the latch 86, so that on the following machine operation, i.e. the first machine operation for the repeated addition, the latch 86 is supported on the rocking of the lever 76 with its pin 354 by the edge 353 of the lever 352, turning clockwise about its pivot 355, so that it does not seize the arm 84 of the locking rail 82, and the type hammer lever 82 on this and the following machine operations of the repeated addition will not be released for printing.

*Multiplying control mechanism.*—A further means for preparing the machine operation for the repeated additions is the above mentioned multiplying control mechanism by means of which the set pin carriage (FIG. 2) cooperates with the storing mechanism 32. Besides the well known step rail 361 (FIG. 3) located at the front side of the set pin carriage designated for the usual step by step actuation on amount setting the set pin carriage is still rigidly connected at its back side with a coupling rail 362. With this coupling rail cooperates a coupling segment 363 (FIGS. 2 and 13) mounted rotatably and shiftably on an axle 365 arranged parallel to the cross rods 42 (FIG. 2).

Parallel with the axle 365 a coupling rod 360 (FIG. 14) is located which at its both ends is fixed to multi-armed levers 366, 367 (FIG. 15) forming with them and a stationarily mounted shaft 368 (FIG. 10) a rocking frame in the following designated as coupling bail 370 rotatably about the axis of the shaft 368. The coupling segment 363 (FIGS. 2 and 13) cooperates by means of a coupling finger 369 directed downwards with the coupling rail 362, whilst it cooperates with an abutment finger 371 directed upwards with the left ends of the above mentioned locking levers 216 (FIG. 2) for the storing wheels 109.

As will be apparent from FIG. 2, the left ends of the locking levers 216 being not in the path of movement of the abutment finger 371 of the coupling segment, when the locking levers in the zero position of the storing wheels 109 engage into the notches 219 of the storing wheels. When, however, a storing wheel is in a digital position the wedge-shaped lug 218 of the related locking lever engages into a tooth gap of its storing wheel so that the left end of the locking lever is rocked further upwardly where it enters the path of movement of the abutment finger 371.

Figure 14:
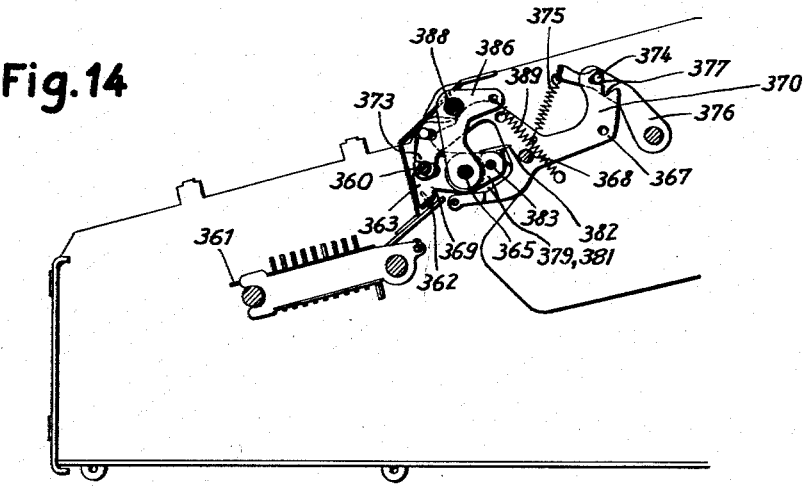
FIG. 14 is a side-elevation of the connection members between the set pin carriage and the storing mechanism.
Figure 15:
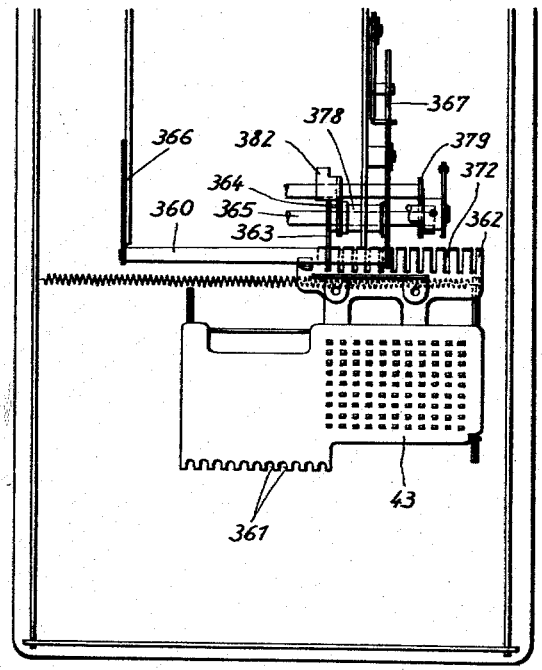
FIG. 15 is a plan view belonging to FIG. 11.

This position of a locking lever is indicated in FIG. 13 by the first locking lever 216 from the right. When the coupling segment 363 is moved to the left it will be stopped by a locking lever 216 rocked in such a manner. When the coupling finger 369 is inserted in one of the slots 372 (FIG. 15) of the coupling rail 362, as is shown in FIGS. 13 and 14, the set pin carriage 43 being coupled with the couple segment 363 so that both move jointly under the action of the spring 63 (FIG. 3) to the left, being not prevented from the locking levers 216 the storing wheels of which are in their zero position, whilst they will be stopped from the locking levers 216 the storing wheels of which are adjusted to a digit value 1 to 9.

The engaging and disengaging of the coupling finger 369 now, takes place by the mentioned coupling rod 360 (FIG. 14) extending through an open slot 373 of the coupling segment 363. This coupling rod 360 lowers or lifts the coupling finger 369 into or out of the slot 372 (FIG. 15) corresponding to the related cross shifting position of the set pin carriage on rocking of the coupling bail 370 about the axis of the shaft 368. The end rocking positions of the coupling bail 370 (FIG. 14) are resiliently secured by the cooperation of a pin 374 of a lever 376 influenced by a spring 375 with two notches 377.

Figure 20:
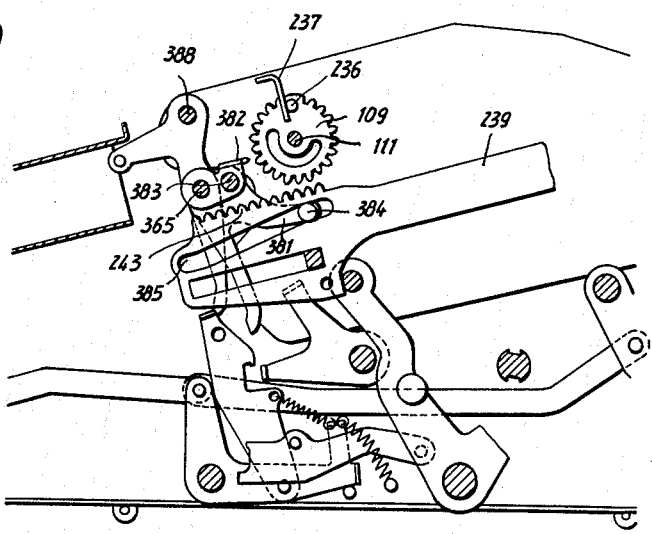
FIG. 20 is a side-elevation of the control means acting with the turning back of the storing wheels.

Adjacent the hub 364 (FIGS. 1 and 13) of the coupling segment 363 a bushing 378 is provided, which is not shiftable with respect the coupling segment but rockable independently about the axle 365 and being flanked by two levers 379, 381 which are connected with each other by a rod 383 (FIG. 14) and being connected with an actuating tooth 382. The actuating tooth cooperates with those storing wheels 109 (FIG. 20) the locking lever 216 (FIG. 13) of which stop the set pin carriage in its cross movement.

As is more fully explained later the point of the actuating tooth 382 (FIG. 20) moves at each machine operation of the repeated addition along a closed path clockwise whereby it engages into the teeth of the oppositely located storing wheel during the downwards movement and moving back the storing wheel by one unit counterclockwise. The lever 381 (FIG. 16) is provided with a projection arm 380 which engages by means of a roller 384 into a cam slot 385 of the above named restoring rail 239. When the restoring rail 239 is oscillated the actuating tooth 382 will be rocked downwards and upwards by the slot 385.

The axle 365 is carried by arms 386 (FIG. 14) and 387 (FIG. 16) fixed to its ends rigidly secured on a stationary mounted shaft 388. On the arm 386 (FIG. 14) a spring 389 is attached which tends to rock the rocking frame formed by the axle 365, the shaft 388 and the arms 386, 387 about the axis of the shaft 388 clockwise.

In the position of rest of the multiplying control mechanism, against a collar 391 of the bushing 378 (FIG. 13) a locking lever 394 contacts which is mounted on a pivot 392 of the set pin carriage and influenced by a spring 393 which usually maintains the bushing 378 and the coupling segment 363 in their outermost right position of rest which will be maintained only during repeated addition.

On setting the multiplicand by the keys 1 the set pin carriage has been moved by a number of steps to the left corresponding to the number of orders of the multiplicand i.e. in the assumed numeral example by two steps. When the coupling finger 369 is rocked by the coupling rod 360 (FIG. 14) into the coupling rail 362, it engages a cut out 372 (FIG. 13), which corresponds to the shifting position of the set pin carriage adjusted to the multiplicand.

The drive for the rocking of the coupling bail 370 about the shaft 368 (FIG. 10), now, is effected by the bail 278 already mentioned in connection with the description of the "storing" and the "repeating," which bail will be moved from the main drive shaft 58 (FIG. 2) by means of a rod 395 and the cam lever 275 at the beginning of each machine operation in order to bring the actuating noses 45 on total taking, out of the range of the set pins 41.

At its right end the bail 278 (FIG. 10) carries a pin 396, which cooperates with a pawl 397, which by a pivot 398 is linked to the right lever arm 387 of the coupling bail 370. The pawl 397 is guided by means of an oblong hole 399 on a pin 401 which is located on a bail 403 mounted on a pivot 402, which bail 403 is held by means of a spring 404 with a nose 405 in contact with a stationary abutment 406.

Figure 10:
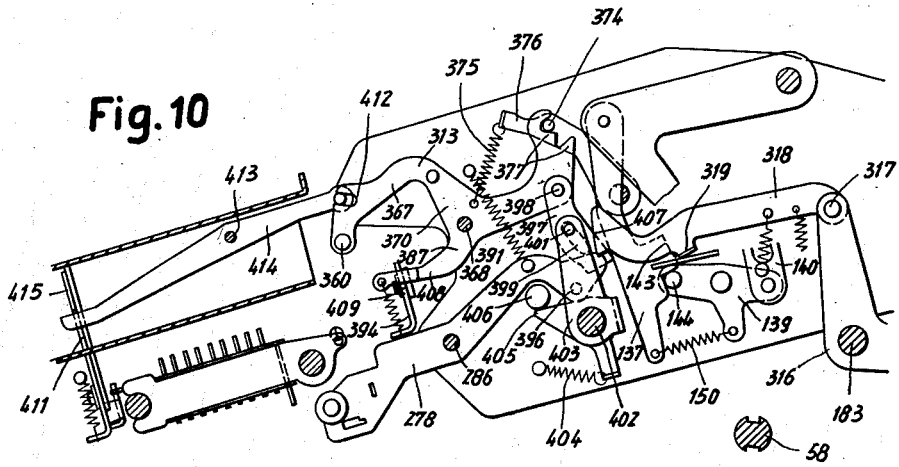
FIG. 10 is a side-elevation of the control-means for the multiplication.

In the inoperative rocking position of the coupling bail 370, represented in FIG. 10, in which its right part is moved downwards the pawl 397 being out of the path of movement of the pin 396. When, now, the multiplier key is depressed as above mentioned, the rod 318 will be shifted to the left and strikes with its left edge 407 against the pin 401 moving it to the left, so that the lower end of the pawl 397 comes to lie above the pin 396. When, then, on the machine operation started by the multiplier key the bail 278 will be rocked counterclockwise, the coupling bail 370 will be rocked counterclockwise by means of the pin 396 and the pawl 397, so that the pin 374 engages into the lower notch 377 retaining the bail in its operative position.

By this rocking of the coupling bail 370, now the following described operations will be performed:

(4) Stepwise cancelling the storing wheels, (5) Disconnecting the normally stepwise shifting of the set pin carriage, (6) Laterally freeing the locking levers 216, (7) Freeing the locking levers 216 for rocking,

*To* (*4*).—The coupling rod 360 rocks the coupling segment 363 (FIG. 14) counterclockwise about the axle 365 whereby the coupling finger 369 engages into the opposite located slot of the coupling rail 362 connecting the set pin carriage with the coupling segment 363.

At the same time the actuating tooth 382 being out of engagement with the storing wheel 109 (FIG. 20) will be rocked upwards, so that it is located opposite the preceding gap of tooth of the wheel 109.

By rocking the coupling bail 370, also the pawl 394 (FIGS. 10 and 13) which maintains the coupling segment 363 (FIG. 13) by supporting the collar 391 (FIG. 13) in the base position will be lifted out, in that a lower arm 408 of the coupling bail acts onto a lug face 409 of the pawl 394.

Figure 11:
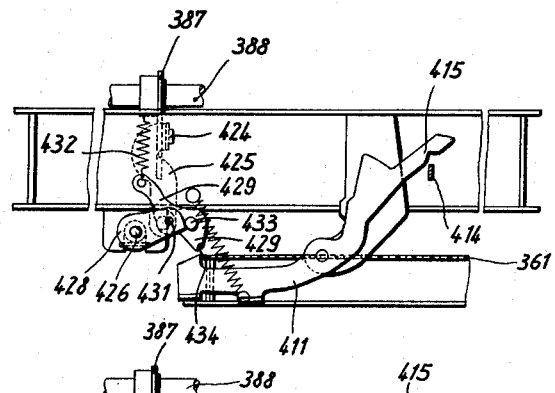
FIG. 11 is a partial front view of the control-device for the set pin carriage.
Figure 12:
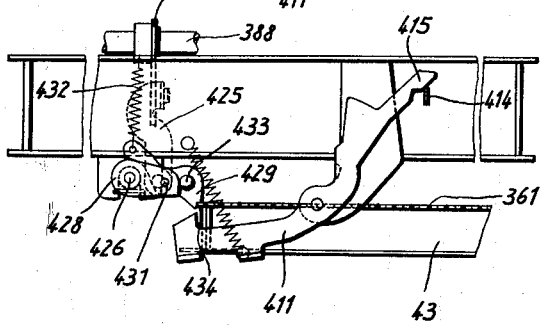
FIG. 12 is a corresponding partial front view in another working position.

*To* (*5*).—Simultaneously with the engaging of the coupling segment 363 into the coupling rail 362 (FIG. 15) the set pin carriage 43 will be disconnected from a catch pawl 411 (FIGS. 11 and 12). For this purpose a lever 414 mounted on the key frame by means of a pivot 413 engages into a slot 412 (FIG. 10) of the lever 367 of the coupling bail, which lever 414 with its left end cooperates with the upper arm 415 of the catch pawl 411. On rocking the coupling bail 370 counterclockwise the left end of the lever 414 will be moved out of the position of FIG. 11 into the position of FIG. 12 so that the catch pawl will be lifted out of the step rail 361 of the set pin carriage. The set pin carriage together with the coupling segment 363 now is enabled to move as far to the left under the action of the spring 62 (FIG. 3) until the coupling segment 363 strikes a locking lever 216 the storing wheel of which stands in a digit position.

A finger 416 (FIG. 9) of the left lever 366, on rocking of the coupling bail 370, frees a bail 417 mounted on the shaft 215, which follows the tension of its spring 418 and puts by means of a pin 419 a pawl 421 into the path of movement of the above mentioned lever 231 (FIG. 7), so that during the machine operation the pawl 421 (FIG. 9) will be seized by the lever 231 and moved to the right. The pawl 421 is linked to the lever 423 secured to the above mentioned shaft 388 by means of a pivot 422, so that also the shaft 388, immediately after the rocking of the coupling bail 370 will be rocked and the actuating tooth 382 (FIG. 20) will be engaged into the opposite storing wheel 109.

*To* (*6*).—The rocking of the shaft 388 (FIG. 16) during the introducing machine operation for the preparation of the repeated addition also causes a lateral freeing movement of the coupling segment 363 (FIG. 13) from the locking lever 216 in order to make the latter freely movable. To this end a rod 425 FIGS. 11, 12 is linked by means of a pivot 424 to a lever 387 secured to a shaft 388, which rod will be moved downwardly and thereby rocks clockwise a lever 427 rigidly secured to the axle 426 and the axle 426 and a lever 428 (FIGS. 11 and 12) fixed to the right end of the axle. On the lever 428 a pawl 429 (FIG. 12) is rotatably mounted by means of a pivot 431. The pawl will be maintained into contact with an edge of the lever 428 by a spring 432 with a pin 433 (FIG. 11) fixed to it.

On rocking the lever 428 clockwise a notch 434 of the pawl 429 comes in engagement with the upper edge of a tooth of the coupling rail 362, whereby the toggle joint formed by the lever 428 and the pawl 429 stretches and the notch 434 displaces the set pin carriage 43 as much to the right that the coupling segment 363 (FIG. 13) is spaced from the locking lever 216. This overstroke of the set pin carriage and of the coupling segment is necessary, in order that the corresponding lever 216 always is enabled to freely falling into the teeth of the storing wheels and is enabled to move into the path of the coupling segment 363 until the locking lever 216 is moved out of the range of the coupling segment by the storing wheel 109 returned in its zero position.

*To* (*7*).—On rocking of the shaft 388 (FIG. 16) and the movement of the actuating tooth 382 to the right the rod 383 will be moved against a lever 435 rotatably mounted on the shaft 388, which lever 435 will be rocked counterclockwise and thereby rocks clockwise a sensing bail 438 which normally holds the locking levers 216 in an ineffective position mounted on a rod 437, whereby by means of a forked end and a pin 436 this sensing bail 438 being moved with its web 440 out of the range of the locking levers 216 into the position represented in FIG. 2 in order to free them during repeated addition.

*Machine operations of the repeated addition.*—As the key lever 122 for the product key 11, after depressing this key, will be locked by the locking rail 177 (FIG. 5) in the described manner in its rocked position and not will be freed at the end of the introducing machine operation for the repeated addition the motor contact 172 remains switched on, so that to the introducing machine operation join automatically the machine operations which are necessary for the complete restoring of all storing wheels. Thereby all adjustings brought about by depressing of the multiplicand key are maintained. The coupling between the coupling segment 363 and the set pin carriage is maintained and the set pin carriage will be displaced step by step to the left as soon as the storing wheel 109 which cooperates with the actuating tooth has been returned by it to zero and a number of machine operations has been performed according to the digital value of the related storing wheel.

The intermediate products added hereby in each order position will be added only to the totalizer but not printed.

With respect to the numeral example on introducing the multiplier "439" the set pin carriage has been moved three steps to the left and then engaged by the coupling segment 363.

On introducing of the multiplicand the abutment finger 371 is stopped by the locking lever 216 of the lowermost denomination being not on zero of the storing mechanism and the multiplicand 23 added nine times to the totalizer each time the storing wheel 109 of said denomination being returned by means of the actuating tooth 382 by one unit. When this storing wheel arrives at zero, the set pin carriage moves by one step to the left and being stopped here by the lockibng lever 216 of the second denomination from the right, where the multiplicand 23 will be added three-times to the totalizer.

Finally, the set pin carriage will be moved into the third denomination from the right, where the multiplicand 23 will be added four times to the totalizer.

The partial products formed in this manner are summed up in the totalizer to the amount 10,097

207
69
92
———
10,097.

As soon as all storing wheels have been returned to zero the last machine operation of the multiplication follows automatically, in which the end product added into the totalizer will be printed on the paper strip by a total taking operation and being transmitted to the storing mechanism.

*Printing of the products.*—When all storing wheels 109 (FIG. 2) stand on zero, all locking levers 216 engage the notches 218 of the storing wheels, whereby their right arms lie so high that the sensing bail 438 can be moved beneath them. A spring 439 (FIG. 18) rocks the sensing bail 438 counterclockwise whereby it, by means of a pin 441, rocks a lever 443 mounted on a stationary pivot 442, which lever 443 lifts by means of a pivot 444 a rod 445. By means of an oblong hole the rod 445 engages over a pin 446 of a pestle 447 which by means of a pivot 448 is linked to the roller lever 55 for the restoring rod 54, which is rocked at this point of time to the right, so that an edge 449 of the pestle 447 moves behind a pin 451, which is fixed to an arm 452 of a bail 453, rotatably mounted on the shaft 274. On the other arm 454 of the bail 453 a rod 455 is linked which is attached to an arm 456 of a bail 458 mounted on a pivot 427. A projection 459 of the arm 456 cooperates with the locking rail 177.

On a bolt 461 of the arm 456 a rod 462 is guided by an oblong hole, which by means of a pivot 463 is linked to a lever 464 rigidly secured to the totalizer controlling axle 127.

The left end of the rod 462 cooperates with the already mentioned rod 152 for the key lever. By means of a pivot 465 on the other arm of the bail 468 a rod 467 is linked, which by means of a pivot 468 is attached to a bail 469, rotatably mounted on an axle 471. The bail 469 engages with a bent over ear 472 over a pawl 473, which is rotatably mounted by means of a pivot 474 on the key lever 117 for the end total taking. The pawl 473 is situated above a rail 475 of a bail 476 rigidly secured on the axle 162.

On rocking back the roller lever 55 into its home position the lifted pestle 447 turns the bail 453 and through the rod 455 the bail 458 counterclockwise, whereby the projection 459 of the bail 458 rocks the locking rail 177 downwards. Thereby the key lever 122 (FIG. 9) of the product key hitherto maintained by the locking rail in its working position will be freed. By the rocking back of the key lever into its home position the previously described adjustments of the product key will be eliminated. When through the rod 467 the bail 469 is rocked clockwise, wherewith its bent over ear 472 lays the pawl 473 over the rail 475, which on the releasing of the axle 162 at the end of the considered last machine operation of the repeated addition takes along the key lever 117 for the end total taking operation through the pawl 473. Thereby the last machine operation terminating the automatic multiplication will be started after the totalizer controlling axle 127 (FIG. 18) has been again rocked to the left, whereby over the lever 464 and the rod 462, which had been lifted by the bail 458 and positioned before the rod 152, this rod had been rocked to the left.

Figure 5:
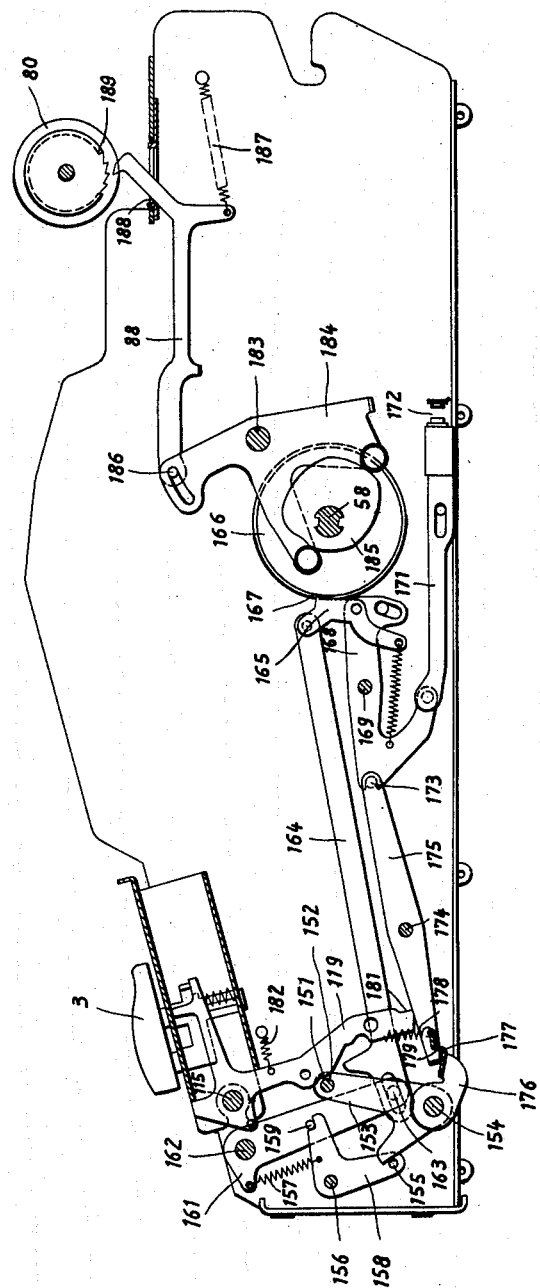
FIG. 5 is a side-elevation of the line-spacing and motor-switching means.

Herewith, as is described in connection with FIG. 5, the bail axle 162 will be released and the motor contact for the additional total taking machine operation closed, after the product is printed and transmitted to the storing mechanism. At the same time, on the returning of the key levers 122, the lever 336 has been again freed through a rod 477 (FIG. 17), a bell crank lever 478, and the already mentioned lever 344 by means of the pin 343. Said lever 336 had been locked in its clockwise rocking position by the engagement of the notch 338 through the pin 359.

*Disconnecting of the total printing.*—When after the termination of a multiplication the total is not to be taken but the individual products of several multiplications in the totalizer are to be stored, the automatic total taking can be disconnected by shifting the lever 19 (FIGS. 1, 18, 19) for the total printing to the right. The total printing lever 19 shiftably mounted on a pivot 479 of the cross wall 26 engages with its forked end over a projection 481 of the bail 479 and takes it along on shifting to the right so that the bent over ear 472 of the bail does not stand above the pawl 473 for the total key lever 117, but over a similar pawl for the number key lever, so that instead of the total taking a non-adding machine operation takes place which is necessary in order to return the set pin carriage 43 into its home position.

*Multiplication with more than two factors.*—By means of the described machine multiplications with more than two factors may be calculated without ado and particularly conveniently without additional adjustments or transmittings. As the product of a multiplication of two factors is retained in the storing mechanism under cancellation of the totalizer it will be only necessary to set a third factor in the key set 1 and to depress the multiplicand key 11 again.

Therewith, the product of two factors contained in the storing mechanism will be treated as new multiplier. By the new depressing of the multiplicand key, it will be effected here too, that an introducing machine operation will be started and the set pin carriage will be coupled with the multiplying control mechanism in its shifted position corresponding to the number of orders of the new factor and that automatically follow machine operations for the repeated addition, the partial products of which belonging to the individual orders of the storing mechanism will be transmitted to the totalizer but not printed. In the total taking machine operation automatically following the last machine operation of the repeated addition, the product now of three factors will be printed under cancelling the totalizer and transmitting to the storing mechanism. In this way products of any number of factors may be calculated as far as permitted by the capacity of the machine.

The printing picture of such a multiplication of more than two factors shows all factors, the intermediate products and the end product. On actuation of the lever 19

(FIG. 1) the printing of the intermediate products will be suppressed. Assumed that the chain multiplication $$439 \times 23 \times 41$$

is to be performed, i.e. the product $$439 \times 23 = 10,097$$

of the above treated numeral example is to be multiplied with 41. As this product 10,097 has been entered into the storing wheels on total taking there it is only necessary to introduce the third factor "41" into the digit keys 1 and then to depress the multiplicand key.

As now the product 10,097 represents the new multiplier and the set pin carriage is in its outermost right hand position the factor 41 will be added seven times in the first position from the right, nine times in the second position from the right and once in the fifth position from the right. In the third and fourth position from the right of the set pin carriage no addition takes place as the coupling segment 363 not will be stopped by the respective locking levers 216 since these are rocked out of the path of the abutment finger 371 of the coupling segment 363. In the totalizer is summed up the amount 40 4 977 which is printed and entered into the storing mechanism.

This chain multiplication may be extended by any number of further factors by introducing each factor by the keys 1 and subsequent depressing the key 11.

The chain multiplication of the above numeral example appears on the paper strip as follows:

\*

439×
23=
10,097\*

41=
404,977\*

\*

What we claim is:
1. In a calculating machine of the class described,
a storing register comprising denominationally arranged storing elements, each of said elements capable of storing any one of the values 0 to 9,
a totalizer,
an actuating mechanism consisting of denominationally arranged, cyclically operable actuating elements performing a rearward movement during the first half of the machine cycle and a forward movement during the second half of the machine cycle,
means for engaging said storing register with said actuating mechanism,
a setting mechanism consisting of a ten keyboard and a set pin carriage cooperating with said keyboard and being movable transversely with respect to said actuating mechanism and along said storing mechanism stepwise from denominational order to denominational order,
means for guiding the multiplier of a multiplication set by means of said ten keyboard into said storing mechanism over said set pin carriage and said actuating mechanism,
means for introducing the multiplicand of said multiplication set by means of said ten keyboard into said set pin carriage,
means for sensing the adjusted digit representation of each storing element one after the other movable along said storing mechanism together with said set pin carriage,
a driving mechanism for cycling the machine operation,
means for combining any number of operations of the machine, and operatively connecting means between said sensing means and said means for automatically combining a number of operations of the machine in each denominational position of the set pin carriage corresponding to the digit of the sensed storing element,
means for disengaging said storing register from said actuating mechanism and means for engaging said totalizer with said actuating mechanism during all operations of the machine allotted to said multiplier, whereby the multiplicand in each denominational position of the set pin carriage will be accumulated in said totalizer as often and in denominational orders corresponding to the values and the denominational orders of the related digits of the multiplier.

2. In a calculating machine according to claim 1, an engaging means for said totalizer maintaining the totalizer out of mesh during the backward movement of said actuating members and in mesh during said forward movement with said actuating members,
said engaging means for the storing register maintaining the storing register during said forward movement in mesh with said actuating members and out of mesh during said backward movement, whereby the amount contained in said actuating members will be transmitted to said storing register,
a clearing device driven by said driving mechanism for restoring the storing elements at the beginning of the next machine operation into their home position, whereby the amount introduced into the storing register during the preceding machine operation will be canceled,
a repeat key,
means for transmitting the amount contained in the storing register from the preceding machine operation to the actuating members on depressing said repeat key,
means for disconnecting from the said driving mechanism said engaging means for the storing elements into said actuating members,
means for disconnecting from the said driving mechanism said clearing device, these two disconnections rendering said storing register ready for multiplying calculations.

3. In a calculating machine according to claim 1, said means for sensing the adjusted multiplier digit of each storing element being movable from a zero position to a position "9,"
an actuating element driven by said driving mechanism and cooperating with said storing element and adapted to return said storing element at each operation of the machine by one digital space towards the zero position,
locking elements each cooperating with one of said storing elements and adapted for locking the transverse movement of said set pin carriage as long as the related storing element being out of its zero position,
a zero notch in each storing element causing a rocking of the related locking element out of the path of said set pin carriage and releasing it for further transverse movement, when the related storing element arrives at its zero position,
and means for jointly sensing said locking elements adapted to disconnect the drive of said actuating element, when all the locking elements have been rocked out of the path of the pin carriage.

4. In a calculating machine according to claim 1, and a multiplier key to be depressed in connection with the setting of the first factor of a multiplication a multiplicand key to be depressed in connection with the setting of the second factor of the multiplication, means for taking the total from the totalizer after the termination of the multiplication of the first and second factor, and means for automatically transmitting the product of the multiplication of the first and second factor into the cleared storing register, the cleared set pin carriage being ready for receiving a further factor entered into said ten key set in connection with again depressing said multiplicand key performing a multiplication of more than two factors.

5. Calculating machine according to claim 1 and a paper strip, a printing mechanism printing the values of the actuating members, a line spacing mechanism for the paper strip, means for automatically taking the total from the totalizer at the termination of a multiplication of two factors, and means for preparing the printing of the intermediate products and repeated addition and the line spacing on a multiplication of more than two factors, whereby only the factors and the different product of them are printed.

6. In a calculating machine according to claim 1, said clearing drive comprising means for cancelling the storing elements at the beginning of the first machine operation of a multiplication before the first factor set up in the ten digit keys has been transmitted to the actuating members, means for transmitting the first factor into the storing mechanism at the second half of the machine operation but excluding its transmitting into the totalizer, and means for preparing, during said first machine operation, the disengaging position of the storing mechanism with the actuating members and for preventing of its cancelling during the following machine of the continuous addition.

7. In a calculating machine according to claim 1, a multiplicand key adapted to release an introducing machine operation of the multiplication after having entered the multiplicand, means for locking said multiplicand key in its depressed position at the end of the machine operation, and means for releasing said locking at the end of the last machine operation of a repeated addition, this means comprising locking levers for the storing wheels, having different positions in the zero position and in the digit positions of their storing elements, a sensing bail cooperating with said locking levers in such a way, that the bail will be locked when one of said storing wheels assumes a digital position 1 to 9 but will be freed when all storing wheels assume their zero positions, and means for releasing said multiplicand key on freeing said bail.

8. In a calculating machine according to claim 1, said setting mechanism comprising ten digit keys and a set pin carriage, said storing elements being storing wheels and locking levers cooperating therewith, a multiplying control mechanism having a laterally shiftable coupling segment provided with a coupling finger coupling it with the set pin carriage, and an abutment finger cooperating with the locking levers for the storing wheels, a spring tending to move the set pin carriage to the left, whereby, on rocking the coupling segment the multiplying control mechanism will be coupled with the set pin carriage for joint movement under the action of said spring.

9. In a calculating machine according to claim 1, said storing elements being mutilated toothed wheels provided each with a zero notch, locking levers cooperating with said zero notch and the tooth gaps of the storing wheels, a bail cooperating with said locking levers and being locked when one of the locking levers is out of engagement with the zero notch of its storing wheel, a multiplicand key releasing the introducing machine operation for the multiplication, means for locking said multiplicand key in its depressed position at the end of the machine operation and keeping it locked, operative connections between said bail and said locking means for the multiplicand key, whereby on freeing said bail by the locking levers the locking of the multiplicand key will be done away with.

10. In a calculating machine according to claim 1, said storing mechanism comprising mutilated toothed storing wheels provided each with a zero notch, locking levers cooperating with said zero notch and the tooth gaps of the storing wheels, a bail cooperating with said locking levers and being locked when one of the locking levers is out of engagement with the zero notch of its storing wheel, a multiplicand key releasing the introducing machine operation for the multiplication, means for locking said multiplicand key in its depressed position at the end of the machine operation and keeping it locked, a totalizing key, means for releasing the multiplicand key at the end of the last machine operation of a repeated addition, and means for automatically setting said totalizing key, whereby the product added in the totalizer will be printed, the totalizer cancelled, the product transmitted to the storing mechanism and the machine will be brought into its position of rest.

11. In a calculating machine according to claim 1, said operative connections comprising a multiplying control mechanism provided with a laterally shiftable and rockable coupling segment having a coupling finger and an abutment finger, said setting mechanism having the form of a set pin carriage, a coupling rail fixed thereto cooperating with said coupling finger, said storing mechanism having storing wheels, locking levers cooperating therewith, a locking pawl cooperating with said coupling segment holding it in its position of rest, a step by step shifting device for the set pin carriage for setting amounts, an actuating tooth connected for lateral movement with said couple segment, means for guiding said actuating tooth along a closed path and for actuating the opposite storing wheel by one actuating unit on each machine operation toward its zero position, means for rocking said coupling segment whereby the coupling finger will enter said coupling rail and connect said set pin carriage with said coupling segment, said locking pawl will be released, said step by step shifting device for amount setting is made ineffective and the abutment finger enabled to cooperate with said locking levers for the storing wheels, and means for disconnecting the coupling segment from the set pin carriage, when all storing wheels assume their zero position.

12. In a calculating machine according to claim 1, a coupling segment having a coupling finger and an abutment finger, locking levers cooperating with said storing wheels, said abutment finger cooperating with said locking levers, said setting device comprising a set pin carriage having a coupling rail cooperating with said coupling finger, a toggle joint, one member of which cooperating with said set pin carriage, and means for stretching said toggle joint after the abutment finger has struck a locking lever, whereby the abutment finger will be lifted from the related locking segment for rendering the locking lever freely movable.

References Cited in the file of this patent

UNITED STATES PATENTS

| | | |
|---|---|---|
| 2,580,295 | Grigsby et al. | Dec. 25, 1951 |
| 2,681,767 | Hopkins | June 2, 1954 |
| 2,726,037 | Landsiedel | Dec. 6, 1955 |
| 2,834,542 | Sundstrand | May 13, 1958 |
| 2,896,842 | Llorens | July 28, 1959 |
| 2,905,382 | Carnacina | Sept. 22, 1959 |
| 2,922,574 | Matthews | Jan. 26, 1960 |
| 2,951,636 | La Pointe | Sept. 6, 1960 |